United States Patent
Wang et al.

(10) Patent No.: US 10,892,860 B2
(45) Date of Patent: Jan. 12, 2021

(54) METHOD, APPARATUS AND SYSTEM FOR CONTROLLING RETRANSMISSION SCHEME

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/477,188

(22) PCT Filed: Mar. 23, 2017

(86) PCT No.: PCT/CN2017/077888
§ 371 (c)(1),
(2) Date: Jul. 10, 2019

(87) PCT Pub. No.: WO2018/170840
PCT Pub. Date: Sep. 27, 2018

(65) Prior Publication Data
US 2019/0363833 A1      Nov. 28, 2019

(51) Int. Cl.
*H04W 72/04* (2009.01)
*H04L 1/18* (2006.01)
*H04L 5/00* (2006.01)

(52) U.S. Cl.
CPC ........... *H04L 1/189* (2013.01); *H04L 1/1819* (2013.01); *H04L 5/0082* (2013.01); *H04W 72/042* (2013.01); *H04W 72/0493* (2013.01)

(58) Field of Classification Search
CPC ........... H04W 72/0493; H04W 72/042; H04L 1/189; H04L 1/1819; H04L 5/0082
See application file for complete search history.

(56) References Cited

U.S. PATENT DOCUMENTS

| | | | |
|---|---|---|---|
| 2006/0002484 A1 | 1/2006 | Miyazaki et al. | |
| 2010/0098045 A1 | 4/2010 | Miyazaki | |
| 2011/0161772 A1* | 6/2011 | Yoshii | H03M 13/255 714/752 |

(Continued)

FOREIGN PATENT DOCUMENTS

| | | |
|---|---|---|
| JP | 2006-019782 A | 1/2006 |
| JP | 2010-103638 A | 5/2010 |
| JP | 2016-504798 A | 2/2016 |

OTHER PUBLICATIONS

International Search Report of PCT application No. PCT/CN2017/077888 dated Jan. 3, 2018.

*Primary Examiner* — Lan-Huong Truong
(74) *Attorney, Agent, or Firm* — Seed IP Law Group LLP

(57) ABSTRACT

There are provided a communication apparatus, method and system, and the communication apparatus, comprises: a transmitter configured to transmit a first data to a terminal and retransmit a second data to the terminal under a retransmission condition after transmitting the first data; and a circuitry configured to control a retransmission scheme for the retransmission of the second data based on at least one of a systematic bit degree and a preempted resource degree for the transmission of the first data.

20 Claims, 9 Drawing Sheets

(56) References Cited

U.S. PATENT DOCUMENTS

2015/0282130 A1 10/2015 Webb et al.
2016/0113008 A1* 4/2016 Damnjanovic ....... H04W 72/14
 370/336
2017/0026297 A1 1/2017 Sun et al.

* cited by examiner

1) Only one CBG is impacted

2) Both CBGs are impacted (1) each UE impacted by 10% for example – impact is minimized (2) UE 2 is impacted by 20% for example – impact is larger compared with 1)

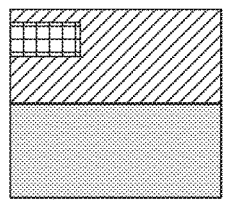
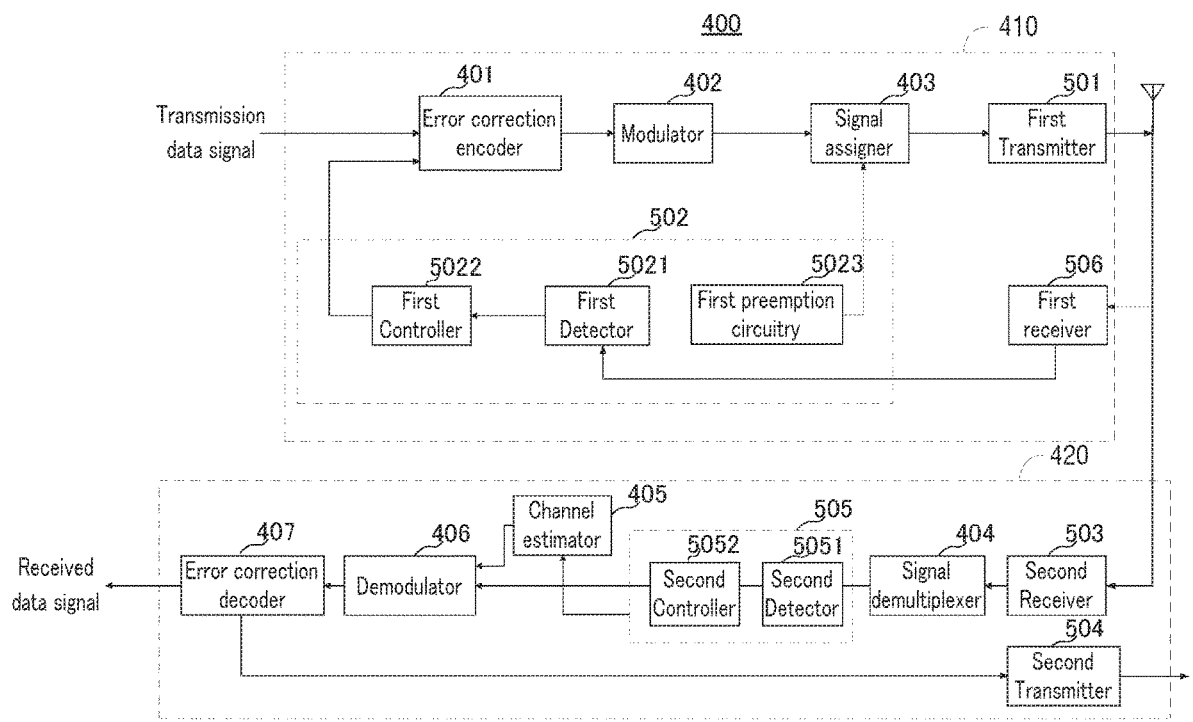
Prioritize UE1's eMBB resource to do preemption
Fig. 3E
Fig. 4

METHOD, APPARATUS AND SYSTEM FOR CONTROLLING RETRANSMISSION SCHEME

BACKGROUND

1. Technical Field

The present technology relates to wireless communication field, and more particular, to a communication apparatus, method and system for controlling retransmission scheme.

2. Description of the Related Art

To meet the demand for wireless data traffic having increased since deployment of 4th-generation (4G) communication systems and Long Term Evolution (LTE), efforts have been made to develop an improved 5th-generation (5G) or pre-5G communication system.

In a wireless communication field, end-user radio or wireless terminals, also known as user equipments (UEs), communicate via a wireless network such as a radio access network (RAN) with a radio base station (RBS or shortly BS), also called "eNodeBs" (eNBs in LTE field), or "gNodeBs" (gNBs in 5G field). The radio access network (RAN) covers a geographical area which is divided into cell areas, with each cell area being served by a radio base station.

A Hybrid Automatic Repeat reQuest (HARQ) feedback process runs in media access control (MAC) layers between a UE and a Node B as a base station. At a transmitter, a packet is transmitted to the receiver. At a receiver, a corresponding HARQ entity receives the packet transmissions and attempts to decode and recover the transmitted packet. The receiver HARQ entity is capable of providing the recovered packets to higher layers in the proper order. When the received packet is not decoded correctly, the receiver sends a negative acknowledgment (NACK) to the transmitter to initiate a retransmission of the packet by the transmitter. Otherwise, the receiver sends an acknowledgment (ACK) for the corresponding packet. Upon receiving a NACK, the transmitter retransmits the corresponding packet according to a retransmission scheme. The process may be repeated until the packet is decoded without an error, or the maximum number of retransmission attempts (e.g., as specified in the standard) is reached.

For a retransmission, the transmitter(s) can retransmit exactly the same packet as in the original transmission. Alternatively, the transmitter(s) can retransmit different versions of the packet. These different versions are indicated by a Redundancy Version (RV) parameter in Release 8 (LTE).

But in LTE, the retransmission and HARQ feedback is per transport block (TB) operated. In a case that a TB includes multiple code blocks (CBs), all the CBs of the TB has to be retransmitted and the retransmission of each CB uses the same retransmission scheme, such as the same redundancy version, if the HARQ feedback is "NACK".

SUMMARY

One non-limiting and exemplary embodiment facilitates providing improved flexibility of the retransmission scheme.

In one general aspect, it is to provide a communication apparatus, comprising: a transmitter configured to transmit a first data to a terminal, and retransmit a second data to the terminal under a retransmission condition after transmitting the first data; and a circuitry configured to control a retransmission scheme for the retransmission of the second data based on at least one of a systematic bit degree and a preempted resource degree for the transmission of the first data.

In another general aspect, it is to provide a wireless communication method, at a communication apparatus, comprising: transmitting a first data to a terminal; retransmitting a second data to the terminal under a retransmission condition after transmitting the first data; and controlling a retransmission scheme for the retransmission of the second data based on at least one of a systematic bit degree and a preempted resource degree for the transmission of the first data.

In another general aspect, it is to provide a communication system, comprising communication apparatus and a terminal: the communication apparatus comprising: a first transmitter configured to transmit a first data to the terminal, and retransmit a second data to the terminal under a retransmission condition after transmitting the first data; and a first circuitry configured to control a retransmission scheme for the retransmission of the second data based on at least one of a systematic bit degree and a preempted resource degree for the transmission of the first data; and the terminal comprising: a second receiver configured to receive the first data transmitted from the communication apparatus and receive the second data retransmitted from the communication apparatus according to the retransmission scheme; a second transmitter configured to indicate the retransmission condition to the communication apparatus after receiving the first data and before receiving the second data; and a second circuitry configured to recover the retransmission scheme for the retransmission of the received second data.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 3B-3E schematically shows examples of options for preemption schemes according to an embodiment of the present invention.

FIG. 4 schematically shows a block diagram of a communication system including a communication apparatus and a terminal according to an embodiment of the present invention.

DETAILED DESCRIPTION

Embodiments will now be described with reference to the drawings, which relate to a communication method, apparatus and system. It is understood that the present technology may be embodied in many different forms and in many different orders and should not be construed as being limited to the embodiments set forth herein. Rather, these embodiments are provided so that this disclosure will be thorough and complete and will fully convey the present technology to those skilled in the art. Indeed, the present technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

While orders of the steps of the methods and the structures of the components are provided herein for exemplary purposes, but not for limitation. The following detailed description of the technology will be presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

Figure 1A:
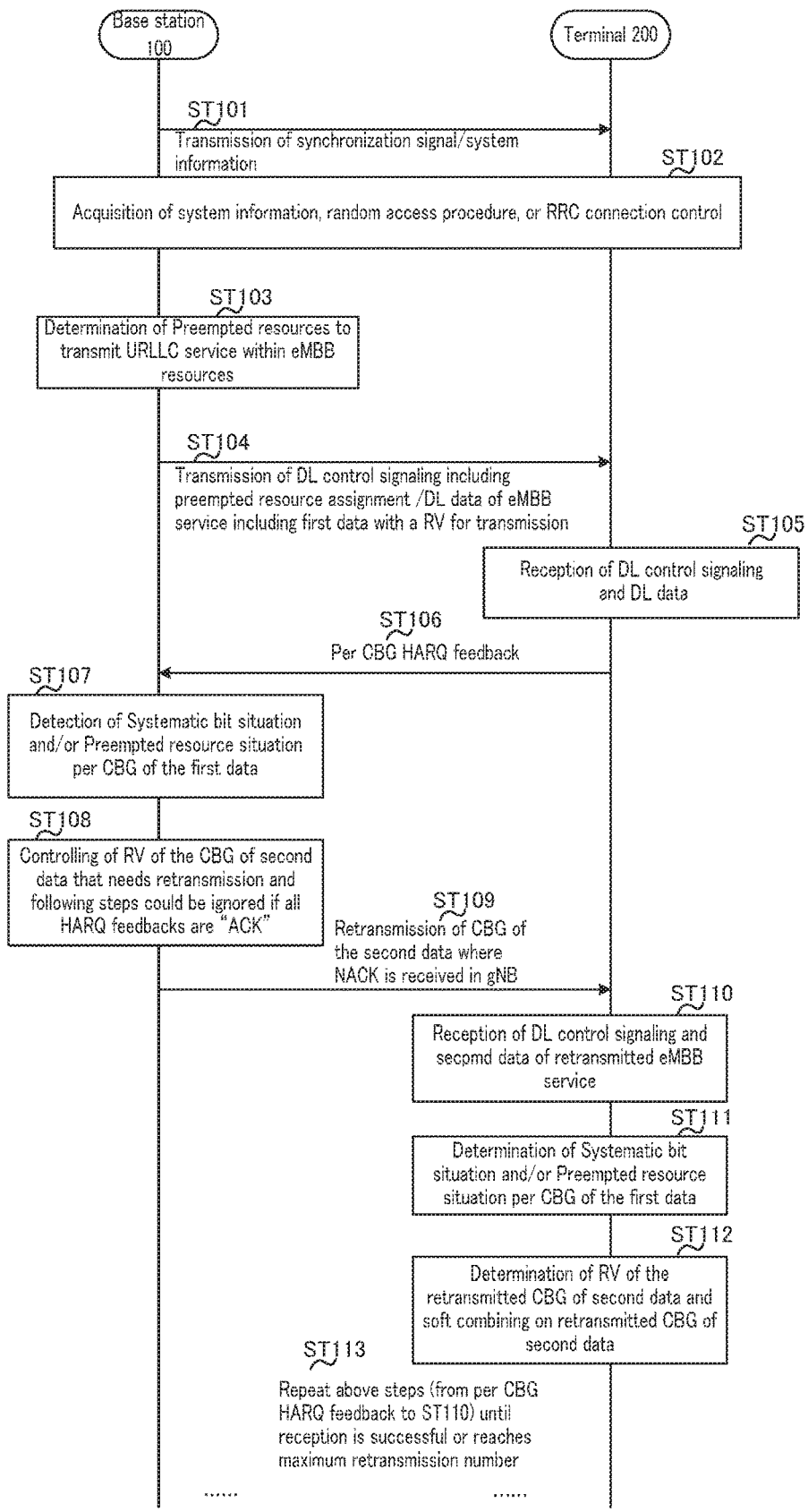
FIG. 1A schematically shows an example of a flowchart of a downlink transmission between a base station and a user terminal according to an embodiment of the present invention.

FIG. 1A schematically shows an example of a flowchart of a downlink (DL) transmission between a base station 100 and a user terminal 200 according to an embodiment of the present invention.

To be noted that this example shows wireless communication between a base station 100 (generally speaking, a communication apparatus) and a user terminal (generally speaking, a terminal below) 200, but the wireless communication is not limited to these two entities. Other entities such as two user terminals can also perform similar wireless communication.

As shown in FIG. 1A, at step ST101, the base station 100 transmits synchronization signals and system information signals to the terminal 200. At step ST102, the base station 100 and the terminal 200 interact with each other to finish acquisition of system information, random access procedure, or Radio Resource Control (RRC) connection control. The steps ST101 and ST102 are about synchronization, acquisition of system information, random access procedure, or RRC connection control, which are conventional steps in a normal wireless communication.

At step ST103, the base station 100 determines preempted resources to transmit URLLC service within eMBB resources if it is necessary to preempt the eMBB resources to transmit URLLC traffic. The step ST103 is about determination of preempted resources to transmit URLLC service within eMBB resources according to embodiments of the present invention, and is an optional step depending on the preemption need. In the embodiments of the present invention, there could be some defined rules on how to select preempted resources within eMBB resources (or how to preempt the eMBB resources). Details will be discussed with reference to FIGS. 3A-3E.

At ST104, the base station 100 transmits DL control signaling (indicating resource assignment information) and DL data of eMBB service to the terminal 200. The DL data includes first data, and in this example, the first data may include one or more CBCs, and to be noted that one CBG is assumed as the minimal HARQ feedback and retransmission unit in this application. CBG means code block group and may consist of one or multiple code blocks. The granularity of CBG may be configured by the base station 100. Of course, the minimal feedback and retransmission unit is not limited to one CBG, but one or more code blocks, one or more CBGs, even one or more TB are also available to the embodiments of the invention. The DL data may be transmitted by preempting resources within eMBB resources in case of performing the step ST103. In a case that the base station 100 is to transmit also URLLC channels, a control signaling to allocate URLLC's resources may also be included in the transmission. Then URLLC UE can receive URLLC channels.

To be noted that the downlink (DL) resource assignment information may be indicated in a DCI transmitted from the base station 100 to the terminal 200. And the resource assignment information is to inform the URLLC target UEs (to which the URLLC service traffic is targeted) that they are supposed to receive the URLLC service traffic, and to inform the other UEs (including some eMBB target UEs (to which the eMBB service traffic is targeted) with their resources preempted). One way to design the DCI is to transmit URLLC DCIs to the respective URLLC target UEs, and transmit eMBB preemption DCIs indicating the eMBB preemption situation to eMBB target UEs. But it may cause large overhead. So the inventor considers additional DCI designs on how to design the DCI on indicating URLLC resource assignment for URLLC target UEs and the DCI on indicating preemption situation for eMBB target UEs. The Following shows some examples.

Example 1) is transmitting group common control signalings to all the terminals in a group including first terminals (eMBB target UEs), which are to receive the first service (eMBB) traffic and second terminals (URLLC target UEs), which are to receive the second service (URLLC) traffic, the group common control signalings respectively indicating resource assignments with respective terminal IDs for the second terminals, wherein, the first terminals (eMBB target UEs) are able to interpret the resource assignments in the group common control signalings to obtain preemption resource situation for themselves. That is, the common DCI for URLLC resource assignment is sent to all the UEs in a group in a group manner. The DCI contains a field corresponding to a Cell Radio Network Temporary Identify (C-RNTI ID) to indicate to which UE the URLLC service traffic is targeted. The DCI further contains a resource block assignment (RBA) field on URLLC resource assignment. Based on this DCI, the URLLC target UE knows that it is the UE to receive URLLC data by interpreting the C-RNTI ID field, and the preempted eMBB UEs know whether their eMBB resources are preempted (or punctured) by interpreting the RBA field.

For example, if 3 URLLC target UEs are assigned in the same slot, 3 URLLC DCIs are sent to all of the URLLC target UEs and the eMBB UEs. These 3 DCIs are received by the URLLC target UEs and the eMBB resource assigned UEs.

This Example 1) can minimize the DCI overhead since there is no need to differentiate or transmit both the DCI for URLLC resource assignment and the DCI for preemption of eMBB UEs.

By the way, the scrambling and the search space operations between the base station and the UE would be based on a group common ID known or configured by RRC.

Example 2) is transmitting control signalings respectively indicating resource assignments to the respective second terminals (URLLC target UEs), and transmitting other control signlings respectively indicating preemption resource situation to the respective first terminals (eMBB target UEs). That is, a DCI for the URLLC service traffic for a URLLC target UE is UE specific. A DCI for preempting (puncturing) eMBB resource indication is group specific manner.

For example, in a case that 3 URLLC UEs are assigned in the same slot, 3 dedicated URLLC DCIs are sent to URLLC target UEs respectively while 1 group common DCI are sent to all the eMBB UEs. The 3 URLLC UEs receive 3 URLLC DCIs respectively. The eMBB resource assigned UEs receive 1 group common DCI indicating the preemption.

This Example 2) may increase 1 group specific DCI, but with less effort on detecting DCIs for the eMBB UEs compared with Example 1).

Figure 2A:
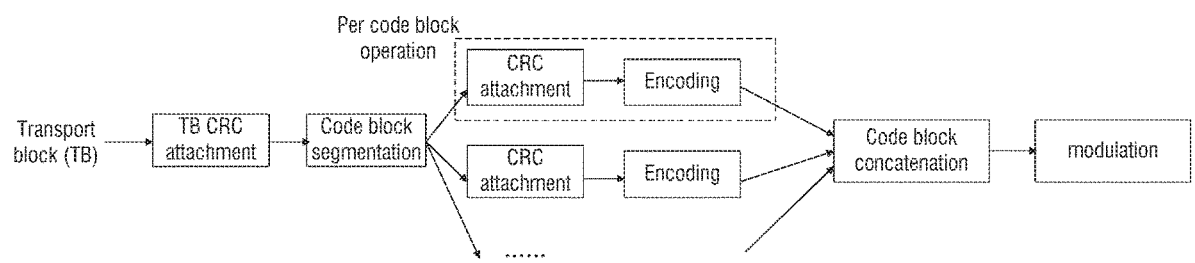
FIG. 2A schematically shows an example of a flowchart for encoding and modulating data to be transmitted from a transmitter.

To be noted that the DL data can be generated by encoding and modulation with reference to FIG. 2A. FIG. 2A schematically shows an example of a flowchart for encoding and modulating data to be transmitted from a transmitter. As shown in FIG. 2A, a transport block may firstly be attached with Cyclic Redundancy Check (CRC) bits, and then the transport block (TB) with CRC bits may be segmented into multiple code blocks (CBs). For each code block, a CRC attachment and an encoding are performed. Then, all the encoded code blocks are concentrated and modulated to generate the transmission data. Conventionally, at the terminal 200, the terminal 200 feeds back a HARQ response to the base station 100 per TB, but in an assumption, the CBs can be grouped into one or several code block groups (CBGs) (in which the number of the CBGs is configurable for example by the base station, i.e., the CBG granularity is configurable), and the terminal 200 can feed back a HARQ response to the base station 100 per CBG so as to improve flexibility and granularity of the HARQ response and the retransmission in response to the HARQ response.

Figure 2B:
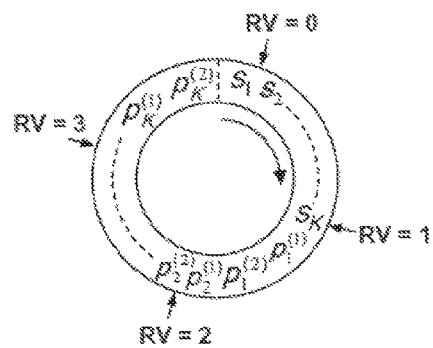
FIG. 2B schematically shows an example of a circular buffer in a turbo encoder, for generating different redundancy versions.

To be noted that the transmission of the DL data (including first data) can be performed according to a transmission scheme. The transmission scheme may include at least one of three types of schemes, i.e., Redundancy Version (RV), New Data indication (NDI) and Modulation and Code Scheme (MCS). The Redundancy Version (RV) has normally 2 bits. Different redundancy versions indicate different starting points of a buffer (such as a circular buffer) including all the systematic bits and all the redundancy bits (or parity bits). That is, different redundancy versions may lead to different sizes/ratios of the systematic bits and the redundancy bits included in the (re)transmitted packet (or data). The detailed RV generation could be found with reference to FIG. 2B. FIG. 2B schematically shows an example of a circular buffer in a turbo encoder, for generating different redundancy versions. As shown in FIG. 2B, $\{S1, \ldots, Sk\}$ are systematic bits and $\{p1, \ldots, pk\}$ are parity bits (i.e., the redundancy bits) regarding a code block. Different RVs' starting positions are different in the circular buffer. RV0 is with more systematic bits and others are with less or no systematic bits. Thus, different transmissions/retransmissions according to different redundancy versions are intended to increase the likelihood of correct decoding. In an example, the redundancy versions may be RV0, RV1, RV2, RV3, and RV0 normally leads to more systematic bits and other RVs lead to less and less or no systematic bits.

To be noted that a control signaling can also be transmitted from the base station 100 to the terminal 200 to indicate the transmission scheme including redundancy version for the data transmission.

At step ST105, the terminal 200 at the UE node receives the DL control signaling, and the DL data including the first data. Here, an assumption is that DL data on the URLLC and eMBB resources are transmitted to the same UE for description simplicity. But the URLLC service and eMBB service can be transmitted to different UEs within this proposed framework.

At step ST106, the terminal 200 feeds back a HARQ response to the base station 100 per CBG. The step ST106 is about HARQ feedback per CBG. When terminal 200 receives eMBB resources, it will feedback HARQ (including ACK and NACK) bits per CBG.

In a case that the terminal 200 feeds back NACK as the HARQ feedback for a transmitted CBG, the base station 100 would decide to retransmit this CBG according to a retransmission scheme (the principal of which is similar to the transmission scheme discussed above).

Conventionally, the retransmission schemes for all the code blocks of a transport block (TB) are the same in LTE. For the downlink HARQ case (in which the terminal 200 transmits data to the base station 100, and the base station 100 feeds back a downlink HARQ response), basically the retransmission according to the redundancy version is based on an explicit indication in a Downlink Control Information (DCI) received from the base station 100 (this is also called explicit scheme), while for the uplink HARQ case (in which the base station 100 transmits data to the terminal 200, and the terminal 200 feeds back an uplink HARQ response to the base station 100, as shown in FIG. 1A), normally, an order is used if no uplink grant (a kind of control signaling) is received for retransmission guidance (this is also called order scheme). As an example of the order, the transmission and retransmission schemes may include for example, an order such as RV0, RV2, RV3, and RV1. That is, the first transmission may use RV0, the retransmission may use RV2, the next retransmission may use RV3, and the next retransmission may use RV1. Another (re)transmission scheme is to determine the redundancy version based on a function of at least one of a subframe index, a slot index and a transmission time interval (TTI) index and other information of the data to be (re)transmitted (also called implicit scheme). But conventionally, the explicit scheme, implicit scheme or order scheme is used for (re)transmission of all code blocks of a TB, so there would be some problems on the performance of this TB, if all the code blocks use the same (re)transmission rule. Another problem occurs in a case that the enhanced mobile broadband (eMBB) resources may be preempted by Ultra-Reliable and Low-Latency Communication (URLLC) services. So for different code blocks or CBGs (preempted or not), the requirements on the (re)transmission scheme would be different.

In order to make different retransmission scheme for different code blocks or CBGs, an simple way is to indicate a RV per CBG in the DCI signaling. It can efficiently adapt different RVs for each CBG based on the preemption situation. However, the demerit of this solution is it will largely introduce overhead for DCI. For example, if 4 CBGs are included in a TB, 8 bits instead of 2 bits are needed in the RV field in the DCI. In case of 2 TBs, the needed field size for RVs is 16 bits, which may not be acceptable due to the limited DCI overhead.

Thus, the inventor considers that for the transmitted preempted code block or CBG which provokes a NACK response and retransmission, this means that the transmitted code block or CBG's systematic bits were not entirely transmitted or correctly decoded, so it is needed to recover more systematic bits by the retransmission, so, to retransmit more systematic bits may be more useful for the correct decoding, but for non-preempted code block or CBG with less systematic bits, to use conventional retransmission scheme, for example, based on an order of [RV0, RV2, RV3, RV1] to get (Incremental Redundancy) IR may be better. So the following steps ST107 and ST108 are considered. To be noted that the steps ST107-ST112 could be ignored if all HARQ feedbacks are "ACK".

At step ST107, detection of at least one of systematic bit situation (or degree including systematic bit size, ratio or others) and preempted resource situation (or degree, including preempted resource size, ratio or others) per CBG (which is the minimal unit for retransmission in response to HARQ feedback in this example) is performed at the base station 100 side. Since the base station is the transmitter in this example, the systematic bit situation and the preempted resource situation could be easily known by the base station 100 in practical implementations. So details are omitted herein.

At step ST108, a determination of retransmission scheme such as RV of the CBG that needs retransmission is performed by the base station 100 in a retransmission condition that "NACK" for the transmitted first data is received by the base station 100 from the terminal 200. The determination is performed based on at least one of the systematic bit situation (degree) and preempted resource situation (degree) of the transmitted first data. For example, if the systematic bit degree is big, for example, more than a systematic bit threshold (which means the CBG with more systematic bits than a determined threshold value regardless of whether to be preempted), or the preempted resource degree is big, for example, more than a preempted resource threshold (which means the CBG is more preempted regardless of how many the systematic bits are included in the CBG), or both of them are big, i.e., the systematic bit degree is more than the systematic bit threshold and the preempted resource degree is also more than the preempted resource threshold (which means that the CBG with more systematic bits is preempted), RV with more systematic bits (for example, a first retransmission scheme for retransmitting the second data with systematic bits more than a threshold) such as RV0 is used for retransmission according to the embodiment of the invention. Otherwise, for example, if the systematic bit degree of the transmitted first data is small (which means the CBG with less systematic bits regardless of whether to be preempted) or preempted resource degree of the transmitted first data is small (which means the CBG is not or less preempted regardless of how many the systematic bits are included in the CBG), a conventional (re)transmission scheme, for example, the RV order [RV0 RV2 RV3 RV1] is used for retransmission.

In an embodiment, the preempted resource threshold could be zero, so that comparing the preempted resource degree with the preempted resource threshold of zero could indicate whether there is any resource preempted. Furthermore, if the preempted resource degree is zero, this indicates that there is no resource preempted.

At step ST109, the CBG for which NACK was previously received is retransmitted as second data included in an eMBB service from the base station 100.

At step ST110, the DL control signaling and the retransmitted second data included in an eMBB service is received by the terminal 200.

At step detection of at least one of systematic bit situation and preempted resource situation per CBG is performed by the terminal 200. Due to overhead restriction in the DCI, there may not be RV indication of each CBG in the DCI. Therefore, the terminal 200 may need to judge the at least one of the systematic bit situation and preempted resource situation per CBG to obtain the RV information by itself. For example, if the URLLC resource size divided by the eMBB resource size of preempted CBG (i.e., the preempted resource ratio) is 60%, it is assumed that the preempted resource ratio is larger compared with a threshold of 50% which threthold could be configured by the RRC or specified in the standard. Otherwise if the URLLC resource size divided by the eMBB resource size of preempted CBG is 20%, it is assumed that the preempted resource ratio is smaller because it is smaller than the threshold.

At step ST112, determination of RV of the retransmitted CBG (or second data) and soft combining on the retransmitted CBG (or second data) is performed by the terminal 200 based on at least one of a systematic bit situation (degree) and a preempted resource situation (degree) for the transmission of the first data (not the retransmitted second data), because the RV of the retransmitted second data was previously determined at the base station 100 based on at least one of a systematic bit situation (degree) and a preempted resource situation (degree) for the transmission of the first data, and after the terminal 200 received the retransmitted second data from the base station 100, the terminal 200 would use the same or similar way to figure out the RV of this retransmitted second data so as to properly decode it.

In an example, the determination can be performed by the terminal 200 based on preempted resource situation or degree of the first data. If the terminal 200 judges that preempted resource degree is small, then RV of retransmitted CBG follows the conventional way, for example, the [RV0, RV2, RV3, RV1] order like in conventional LTE. In other examples, the RV of retransmitted CBG could be obtained from explicit way or implicit way as mentioned above. However, if the terminal 200 judges that preempted resource size or ratio is large, the RV of retransmitted CBG is determined as RV0 which has more systematic bits according to the embodiment of the present invention.

in another example, the determination can be performed by the terminal 200 based on both of the systematic bit situation of the transmitted first data (in this example, preempted eMBB resource) and the preempted resource situation of the transmitted first data. If the systematic bit size or ratio of preempted eMBB and preempted resource size or ratio are both large, the RV of retransmitted CBG (second data) is determined as RV0. Otherwise if systematic bit size or ratio of preempted eMBB or preempted resource size or ratio is small, the RV of retransmitted CBG (second data) is determined as in conventional way, for example, in the [RV0, RV2, RV3, RV1] order as in conventional LTE.

In another example, the determination can be performed by the terminal 200 based on only the systematic bit situation. If the systematic bit size or ratio is small, the RV of retransmitted CBG (second data) is determined as RV0. Otherwise if systematic bit size or ratio is small, the RV of retransmitted CBG (second data) is determined as in conventional way, for example, in the [RV0, RV2, RV3, RV1] order as in conventional LTE.

Step ST113 is about repeating the above steps (from per CBG HARQ feedback to ST112) until the reception or the decoding is successful or a maximum retransmission number is reached.

Thus, with the embodiments of the present invention, if the transmitted first data provokes an NACK response and a retransmission is needed, the retransmission scheme can be flexibly determined based on at least one of a systematic bit degree and a preempted resource degree for the transmission of the first data. If the at least one of a systematic bit degree and a preempted resource degree for the transmission of the first data is larger, this means that the first data's systematic bits were not entirely transmitted or correctly decoded, and the retransmission scheme can be determined as a retransmission scheme with more systematic bits, so the retransmitted second data may include more systematic bits, and can resist bad communication environment, and the terminal 200 receiving this retransmitted second data can decode it more correctly by receiving more systematic bits. The flexibility for the retransmission scheme and the decoding performance of the retransmitted data can be improved.

The above description together with FIG. 1A describes an example for a downlink data transmission communication between the base station 100 and terminal 200, but the communication is not limited to this. For example, uplink data transmission communication between the base station 100 and terminal 200 and sidelink data transmission communication between the terminals 200 are also available based on the principal of the present invention.

Furthermore, to be noted that the above description describes detailed examples, such as eMBB resources, URLLC traffic, RV0-RV3, CBG and so on, but the embodiments of the present invention are not limited to these, but other resources, other traffic, other (re)transmission scheme including other redundancy version, other minimal HARQ unit and so on are also available.

Figure 1B:
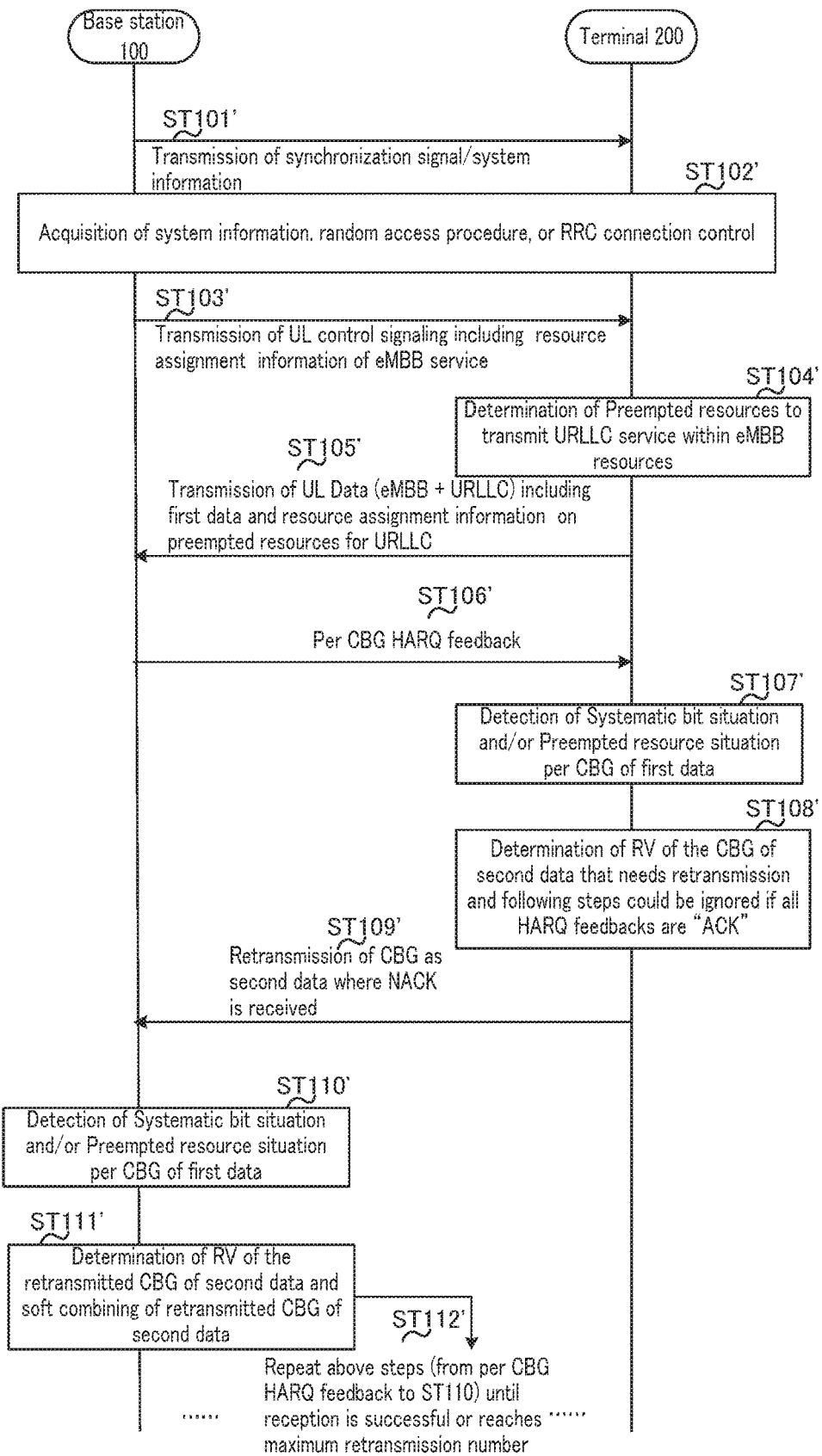
FIG. 1B schematically shows an example of a flowchart of an uplink transmission between a base station and a user terminal according to an embodiment of the present invention.

FIG. 1B schematically shows an example of a flowchart of an uplink (UL) transmission between a base station and a user terminal according to an embodiment of the present invention.

Although FIG. 1B shows an uplink transmission from the terminal 200 to the base station 100, some steps are the same with or similar to the corresponding steps as shown in FIG. 1A. so Details are omitted for these steps.

At step ST101 the base station 100 transmits synchronization signals and system information signals to the terminal 200. At step ST102', the base station 100 and the terminal 200 interact with each other to finish acquisition of system information, random access procedure, or RRC connection control.

At step ST103', the base station 100 transmits a UL control signaling including resource assignment information of eMBB service to the terminal 200.

At step ST104', the terminal 200 determines preempted resources to transmit URLLC service within eMBB resources if it is necessary to preempt the eMBB resources to transmit URLLC traffic.

At ST105', the terminal 200 transmits UL information indicating (optional) preempted resource indication and UL data of eMBB service to the base station 100. The UL data includes first data, and in this example, the first data may include one or more CBGs, and for example, one CBG is the minimal HARQ feedback and retransmission unit.

At step ST106', the base station 100 receives the UL information and the UL data, and feeds back a HARQ response to the terminal 200 per CBG.

In a case that the base station 100 feeds back NACK as the HARQ feedback for a transmitted CBG, the terminal 200 would decide to retransmit this CBG according to a retransmission scheme.

At step ST107', detection of at least one of systematic bit situation (or degree including systematic bit size, ratio or others) and preempted resource situation (or degree, including preempted resource size, ratio or others) per CBG (which is the minimal unit for retransmission in response to the HARQ feedback in this example) is performed at the terminal 200 side.

At step ST108', a determination of retransmission scheme such as RV of the CBG that needs retransmission is performed by the terminal 200 in a retransmission condition that "NACK" for the transmitted first data is received by the terminal 200 from the base station 100. The determination is performed based on at least one of the systematic bit situation (degree) and preempted resource situation (degree) of the transmitted first data. For example, if the systematic bit degree is big, for example, more than a systematic bit threshold (which means the CBG with more systematic bits regardless of whether to be preempted), or the preempted resource degree is big, for example, more than a preempted resource threshold (which means the CBG is more preempted regardless of how many the systematic bits are included in the CBG), or both of them are big, i.e., the systematic bit degree is more than the systematic bit threshold and the preempted resource degree is also more than the preempted resource threshold (which means that the CBG with more systematic bits is preempted), RV with more systematic hits (for example, a first retransmission scheme for retransmitting the second data with systematic bits more than a threshold) such as RV0 is used for retransmission according to the embodiment of the invention. Otherwise, for example, if the systematic bit degree of the transmitted first data is small (which means the CBG with less systematic bits regardless of whether to be preempted) or preempted resource degree of the transmitted first data is small (which means the CBG is not or less preempted regardless of how many the systematic bits are included in the CBG), a conventional (re)transmission scheme, for example, the RV order [RV0 RV2 RV3 RV1] is used for retransmission.

At step ST109', the CBG for which HACK was previously received is retransmitted as second data included in an eMBB service from the terminal 200.

At step ST110', the DL control signaling and retransmitted the second data included in an eMBB service is received by the terminal 200, and detection of at least one of the systematic bit situation and the preempted resource situation per CBG is performed by the base station 100 to figure out the RV for the retransmitted second data.

At step ST111', determination of RV of the retransmitted CBG (or second data) and soft combining on the retransmitted CBG (or second data) is performed by the base station 100 based on at least one of a systematic bit situation (degree) and a preempted resource situation (degree) for the transmission of the first data (not the retransmitted second data), because the RV of the retransmitted second data was previously determined at the terminal 200 based on at least one of a systematic bit situation (degree) and a preempted resource situation (degree) for the transmission of the first data, and after the base station 100 received the retransmitted second data from the terminal 200, the base station 100 would use the same or similar way to figure out the RV of this retransmitted second data so as to properly decode it.

Step ST112' is about repeating the above steps (from per CBG HARQ feedback to ST111') until the reception or the decoding is successful or a maximum retransmission number is reached.

To be noted that a period may be set for enabling the detection and the determination steps, for example, ST107 and ST108, or ST107' and ST108', and may be configured by the base station. In particular, the base station may transmit period information to the terminal to start a timer and end the timer simultaneously with the timer in the base station. After the timer expires, the retransmission of all CBGs of a TB follows the conventional scheme for non pre-empted services, for example, the explicit scheme, the implicit scheme or the order scheme as mentioned above.

Thus, with the embodiments of the present invention, the flexibility for the retransmission scheme and the decoding performance of the retransmitted data can be improved.

Now, the preemption example during a transmission is further discussed in details as below.

Figure 3A:
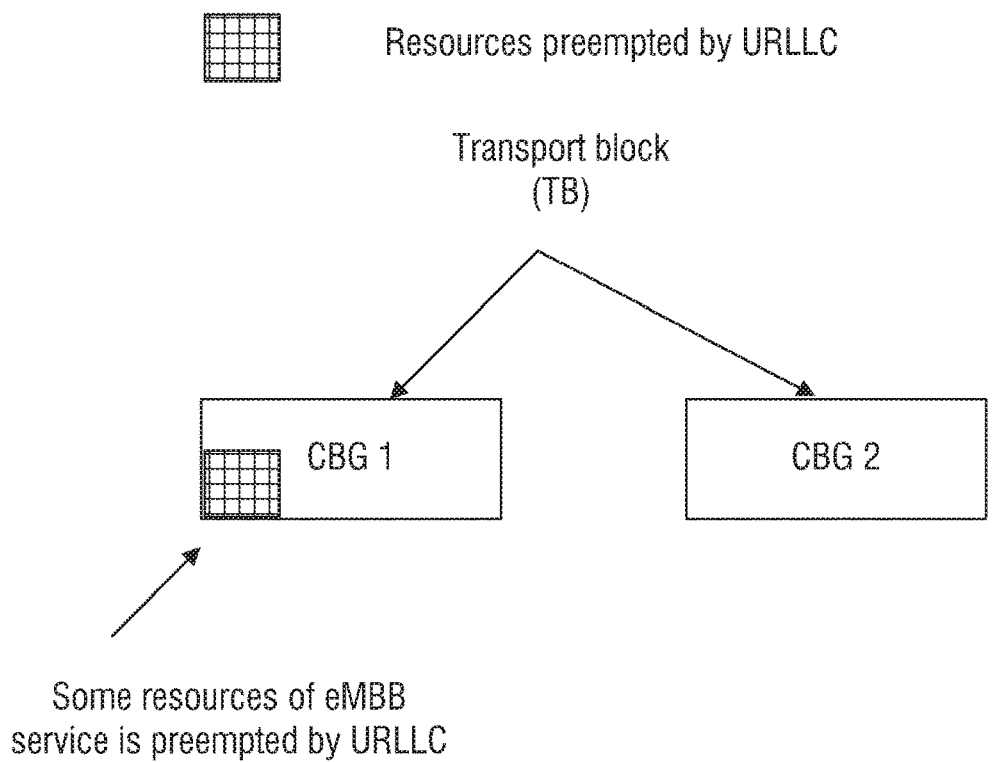
FIG. 3A schematically shows a preemption example during a transmission, showing Enhance Mobile Broadband (eMBB) resources preempted by Ultra-Reliable & Low latency Communications (URLLC) traffic in New Radio (NR) field.

FIG. 3A schematically shows a preemption example during a transmission, showing Enhance Mobile Broadband (eMBB) resources preempted by Ultra-Reliable & Low latency Communications (URLLC) traffic in New Radio (NR).

As shown in FIG. 3A, in New Radio (NR)'s assumption, during transmitting eMBB service traffic on eMBB resources, when it is necessary to transmit URLLC service traffic (traffic), since the URLLC service traffic may be more important or urgent, it is allowed to preempt the eMBB resources to transmit the URLLC service traffic. For example, a transport block may include CBG1 and CBG2, i.e., CBG1 with a CBG index of 1, and CBG2 with a CBG index of 2. The transport block including the CBG1 and the CBG2 is supposed to transmit the eMBB service traffic, when it is necessary to transmit URLLC traffic, some resources of the eMBB service for transmitting CBG1 can be preempted by the URLLC traffic. This preemption scheme is only an example, but other options can be applied to the preemption scheme.

FIG. 3B-3E schematically shows examples of options for preemption schemes according to an embodiment of the present invention.

Figure 3B:
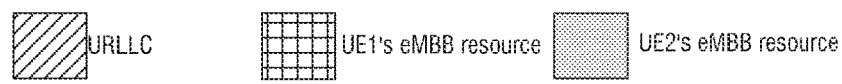
Figure 3B:
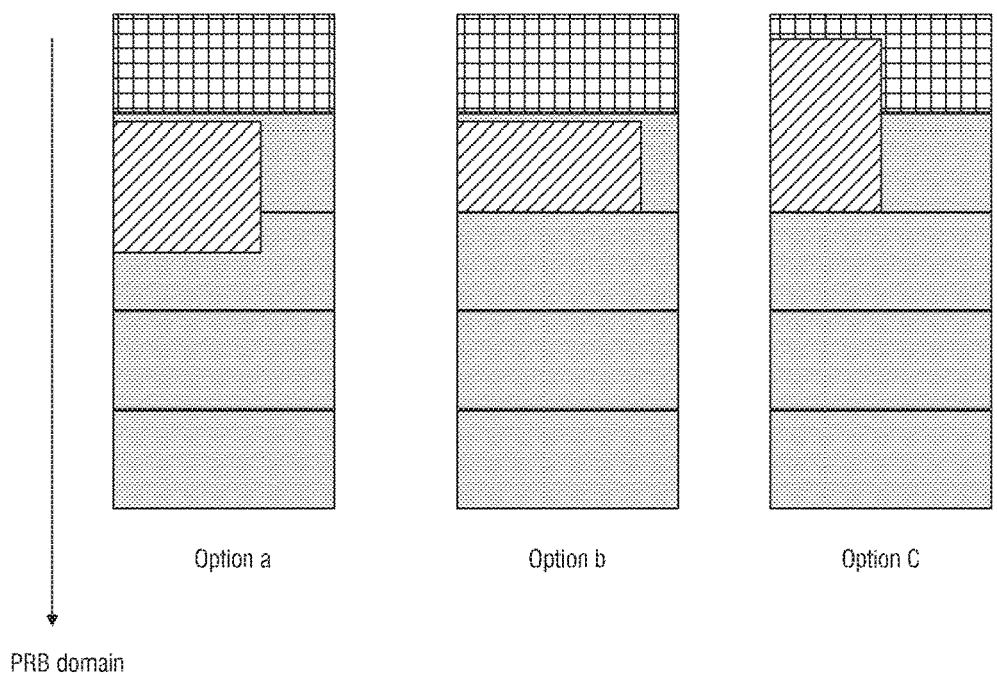

As shown in FIG. 3B, an Option 1 is minimizing the number of terminals whose first service (eMBB in this example) resources are to be preempted by a second service (URLLC in this example) data, that is, to minimize the impacted terminal (such as UE) number. For example, if the URLLC data needs to transmit 2 physical resource blocks (PRBs), the eMBB resource size for UE1 is 1PRB (as shown in diagonal rectangles), and the eMBB resource size for UE2 is 4 PRBs (as shown in gray rectangles), as shown in FIG. 3B. Then in order to minimize the number of terminals whose eMBB resources are to be preempted by the URLLC data, optionally, only the UE2's eMBB resource(s) is selected for preemption (as shown as option a covering two PRBs and option b covering only one PRB in FIG. 3B). In this case, the grant (control signaling) to indicate the preempted URLLC resource could be only sent to UE2 so as to limit the control signaling overhead and transmission target. Alternatively, only UE1's eMBB resource can also be selected for the preemption (not shown in FIG. 3B). Compared with the URLLC resource preempting two UEs' resources (as shown as option c in FIG. 3B), the impacted UE number can be minimized, and the control signaling overhead and transmission can be reduced.

An Option 2 is limiting a preempted resource size or ratio within a first service (eMBB) resource by a size or ratio threshold. In this case, a threshold on preempted resource ratio is defined to realize this Option 2. And here it assumes that URLCC data need one PRB and the UE1 is with 1 PRB eMBB and the UE2 with four PRB eMBB. If the preempted resource ratio is higher than the threshold, the current eMBB resource cannot be preempted. Taking the case shown in FIG. 3B for an example, if the threshold may be defined as 60%, then the UE1's eMBB resource (1PRB) cannot be preempted because if the UE's eMBB resource (1PRB) is preempted, the preempted ratio is 100% (larger than the threshold 60%), but the UE2's eMBB resources can be preempted, because its preempted ratio is 25% (1PRB/4PRB) which is lower than the threshold. Select which eMBB resource for such preemption may be based on the amount of the preempted resource ratio (for example, the eMBB resource with the smallest preempted resource ratio could be selected for the preemption).

Figure 3C:
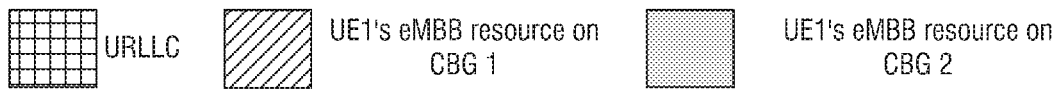
Figure 3C:
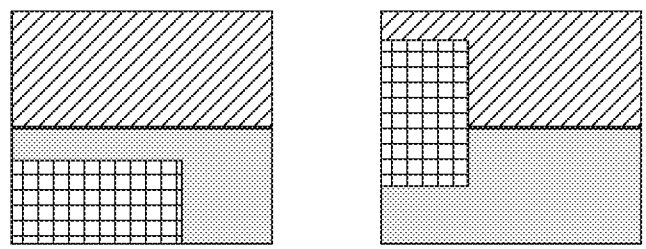

As shown in FIG. 3C, an Option 3 is minimizing the number of code blocks which are to be preempted, that is, to minimize the impacted code block number. For example, if the resources transmitting one code block can transmit the preempted URLLC service and the preempted ratio is small as shown in the left portion of the FIG. 3C, such resources are selected for preemption. This option could reduce the impacted code block number, compared with that both two code blocks are preempted as shown in the right portion of the FIG. 3C.

Figure 3D:
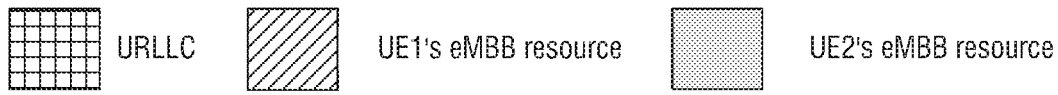
Figure 3D:
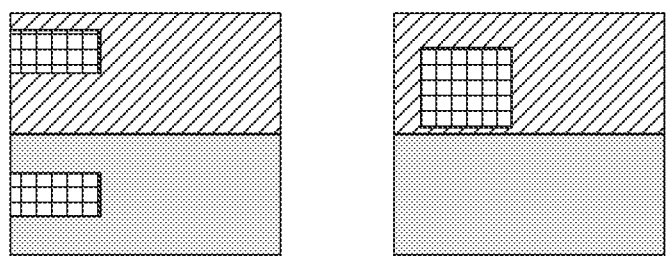

As shown in FIG. 3D, an Option 4 is averaging preempted resource sizes or ratios among the first service (eMBB) resources, so that even size or even ratio of multiple UEs' eMBB resources among the eMBB resources is preempted. For example if the URLLC traffic needs 0.5 PRB (6 subcarries) transmission and there are two UEs' eMBB resources available (each has 30 subcarries), 3 subcarries of each UE may be used for preemption. The benefit of such solution is that the impacted ratio of each UE is smaller, for example, only 10% of each UE is preempted, compared to the right portion of the FIG. 3D in which 20% of only one UE2's resource is preempted. In this case, the grant (control signaling) to indicate the preempted URLLC resource may need to be sent to all the impacted UEs. Such grant (control signaling) may be transmitted in a group common control channel or a control channel that may be mapped on a group common search space or common search space.

As shown in FIG. 3E, an Option 5 is specifying first service (eMBB) resources for a terminal which is to receive both a first service (eMBB) data and the second service (URLLC) data, to be preempted by the second service (URLLC) data, that is, to prioritize the same UE who receives the eMBB service for URLLC preemption. It can save the indicated grant control signaling overhead. Otherwise, if the preempted eMBB service is transmitted to UE1 but the URLLC service is transmitted to UE2, then the base station may need to transmit the URLLC control signaling twice to the UE1 and the UE2 respectively. One is used to indicate URLLC resource assignment for reception of URLLC service for UE2. Another one is used to indicate URLLC resource assignment for UE1 to improve successful decoding possibilities of impacted eMBB service.

Option 6: Any combination of the above 5 options may also applied, for example, a combination of the option 5 and the option 3. That is, when same UE (to transmit both eMBB and URLLC) resource(s) is selected for preemption, the impacted code block number is also reduced for such UE resource(s). This combination is an example, but other combinations are available.

Thus, the preemption scheme according to the embodiments of the invention can further optimize the performance or signaling overhead.

FIG. 4 schematically shows a block diagram of a communication system 400 including a communication apparatus and a terminal according to an embodiment of the present invention.

In this embodiment, the communication apparatus and the terminal are not limited to the base station or the user equipment (UE). The communication apparatus transmits data (CBG) and may be the base station or the UE. The terminal receives the transmitted data (CBG) and may be the base station or the UE. Both the communication apparatus and the terminal may be two terminals or others.

The communication system 400 mainly comprises a communication apparatus 410 and a terminal 420, the communication apparatus 410 comprising: a first transmitter 501 configured to transmit a first data to a terminal 420, and retransmit a second data to the terminal 420 under a retransmission condition after transmitting the first data; and a first circuitry 502 configured to control a retransmission scheme for the retransmission of the second data based on at least one of a systematic bit degree and a preempted resource degree for the transmission of the first data; and the terminal 420 comprising: a second receiver 503 configured to receive the first data transmitted from the communication apparatus 410 and receive the second data retransmitted from the communication apparatus 410 according to the retransmission scheme; a second transmitter 504 configured to transmit an response signal indicating the retransmission condition to the communication apparatus 410 after receiving the first data and before receiving the second data; and a second circuitry 505 configured to recover the retransmission scheme for the retransmission of the received second data.

The flexibility for the retransmission scheme and the decoding performance of the retransmitted data can be improved.

In an embodiment, the second transmitter 504 may be configured to transmit a negative response (such as a NACK HARQ response to indicate an incorrect receiving or an incorrect decoding) to the communication apparatus 410 if the second receiver 503 did not correctly receive the first data, or transmit no response to the communication apparatus 410 in a case that the second circuitry discovers that the first data was preempted, to indicate the retransmission condition to the communication apparatus 410. The communication apparatus 410 may further includes a first receiver 506 configured to receive the negative response from the terminal 420, or receive no response from the terminal 420. In a case that the first receiver 506 receives no response from the terminal 420, the first circuitry 502 may be configured to determine the first data to be retransmitted if the first data was preempted for the transmission.

In an embodiment, the retransmission condition may include at least one of a first retransmission condition that the first receiver 506 in the communication apparatus 410 receives a negative response from the terminal 420, and a second retransmission condition that the first receiver 506 receives no response such as a HARQ response from the terminal 420. However, the retransmission condition is not limited to these two conditions, but other retransmission conditions are available as long as these can provoke a retransmission.

In an embodiment, in the case of second retransmission condition, the first circuitry 502 may obtain the CBG index(es) for retransmission, implicitly based on CBG preemption situation, such as whether the transmitted CBG(s) is preempted. If the transmitted CBG(s) is preempted, the index(es) of the transmitted CBG(s) may be determined for retransmission.

In an embodiment, the first circuitry 502 may include a first preemption circuitry 5023 configured to preempt first service resources for transmitting first service traffic to terminals by second service traffic according to a preemption scheme to make the first transmitter transmit the preempted first data, and in an embodiment, the preemption scheme may include at least one of: minimizing the number of terminals whose first service resources for transmitting the first service traffic are to be preempted by the second service traffic; limiting a preempted resource size or ratio within a first service resource by a size or ratio threshold; minimizing the number of code blocks which are to be preempted; averaging preempted resource sizes or ratios among the first service resources for transmitting first service traffic; and specifying the first service resources for transmitting the first service traffic to terminals which are to receive both the first service traffic and the second service traffic, to be preempted by the second service traffic.

Thus, the preemption scheme for the preemption can be flexible and further optimize the performance or signaling overhead.

In an embodiment, and in an embodiment, the first transmitter 501 may be configured to transmit control signalings indicating the preemption according to a control signaling scheme, and in an embodiment, the control signaling scheme includes at least one of: transmitting group common control signalings to all the terminals in a group including first terminals which are to receive the first service traffic and second terminals which are to receive the second service traffic, the group common control signalings respectively indicating resource assignments with respective terminal IDs for the second terminals, and in an embodiment, the first terminals are able to interpret the resource assignments in the group common control signalings to obtain preemption resource situation for themselves; transmitting control signalings respectively indicating resource assignments to the respective second terminals, and transmitting other control signlings respectively indicating preemption resource situation to the respective first terminals.

Thus, the DCI designs would be flexible.

In an embodiment, the systematic bit degree may include a size of systematic bits within the first data, or a ratio of the systematic bits within the first data, and the preempted resource degree may include a size of preempted resources within the first data, or a ratio of the preempted resources within the first data.

In an embodiment, the first circuitry 502 may include a first detector 5021 configured to detect a first condition based on at least one of a systematic bit degree and a preempted resource degree for the transmission of the first data, and a first controller 5022 configured to determine the retransmission scheme as a first retransmission scheme for retransmitting the second data with systematic bits more than a threshold, under a first condition. The first condition may include: the systematic bit degree is more than a systematic bit threshold; the preempted resource degree is more than a preempted resource threshold; or the systematic bit degree is more than a systematic bit threshold and the preempted resource degree is more than a preempted resource threshold, or else.

In an embodiment, the preempted resource threshold could be zero, so that comparing the preempted resource degree with the preempted resource threshold of zero could indicate whether there is any resource preempted. Furthermore, if the preempted resource degree is zero, this indicates that there is no resource preempted.

In an embodiment, the first retransmission scheme may include a redundancy version with the most systematic bits, and in an embodiment, different redundancy versions may indicate different starting points of a buffer including all the systematic bits and all the redundancy bits.

In an embodiment, the first controller 5022 may be configured to control the retransmission scheme as a second retransmission scheme for retransmitting the second data, in a second condition other than the first condition, and in an embodiment, the second retransmission scheme may be for retransmitting the second data with systematic bits no more than a threshold, or may be defined by a transmission scheme order, or may be determined by a rule common to the communication apparatus 410 and the terminal 420.

In an embodiment, the second circuitry 505 may include a second detector 5051 configured to determine the systematic bit degree from a redundancy version for the transmission of the received first data and the preempted resource degree for the transmission of the received first data, and a second controller 5052 configured to determine the retransmission scheme for the retransmission of the received second data based on at least one of the systematic bit degree and the preempted resource degree for the transmission of the first data. Different redundancy versions indicate different starting points of a buffer including all the systematic bits and all the redundancy bits.

In an embodiment, the second detector 5051 may be configured to determine the redundancy version for the transmission of the received first data by a received control signaling, or defined by a transmission scheme order, or determined by a rule common to the communication apparatus 410 and the terminal 420. The second detector 5051 may be configured to determine the preempted resource degree for the transmission of the first data by a received signal indicating the preempted resource degree.

in an embodiment, the rule common to the communication apparatus 410 and the terminal 420 may include a function of at least one of a subframe index, a slot index and a transmission time interval (TTI) index and others of the first data or the second data to be transmitted. Other rules are also available as long as the second retransmission scheme can be determined.

In an embodiment, the second data may be minimal data needed to be retransmitted under the retransmission condition, for example, the second data may include one or more CBGs which need to be retransmitted, but may not include other CBGs which provoke ACK response in the HARQ response.

Thus, the preemption scheme according to the embodiments of the invention can be flexible and further optimize the performance or signaling overhead.

In addition to the above mentioned structure, the communication system 400 may still include some conventional circuitries for performing conventional operations. For example, the communication system 400 may further include an error correction encoder 401 configured to encode the transport blocks (in a case of retransmission, according to a retransmission scheme controlled by the first controller 5022) to obtain the encoded data, a modulator 402 configured to modulate the encoded data to obtain the modulated data, a signal assigner 403 configured to perform preemption on the modulate data (if the preemption is necessary) according to a preemption scheme controlled by the first preemption circuitry 5023, and a first transmitter 501 configured to transmit the preempted data including the first data. The communication system 400 further include a signal demultiplexer 404 configured to demultiplex the received data, a channel estimator 405 configured to estimate the channel of the demultiplexed data, a demodulator 406 configured to demodulate the &multiplexed data according the result of the channel estimation from the channel estimator 405 (and the retransmission scheme determined by the second controller 5052, if the received data is retransmitted), and a error correction decoder 407 configured to decode the demodulated data to recover the received data signal.

To be noted that although FIG. 4 shows the three parts, i.e., error correction encoder 401, the modulator 402 and the signal assigner 403 are discrete parts separate from the first circuitry 502, but this is only an example, but not a limitation, in fact, for example, the three parts may be within the first circuitry 502 or integrated with the first circuitry 502 in a package as an integrated circuit. Similarly, the signal demultiplexer 404, the channel estimator 405, the demodulator 406, the error correction decoder 407 are discrete parts separate from the second circuitry 505, but this is only an example, but not a limitation, in fact, the three parts may be within the second circuitry 505 or integrated with the second circuitry 505 in a package as an integrated circuit.

To be noted that although FIG. 4 shows the first detector 5021 and the first controller 5022 in separate units, this is only an example, but not a limitation. For example, they may be within one unit or integrated with each other as an integrated circuit, or they may be in other forms.

Of course, these additional structures are a conventional example, but less or more structures may also be available to realize different functions.

Figure 5:
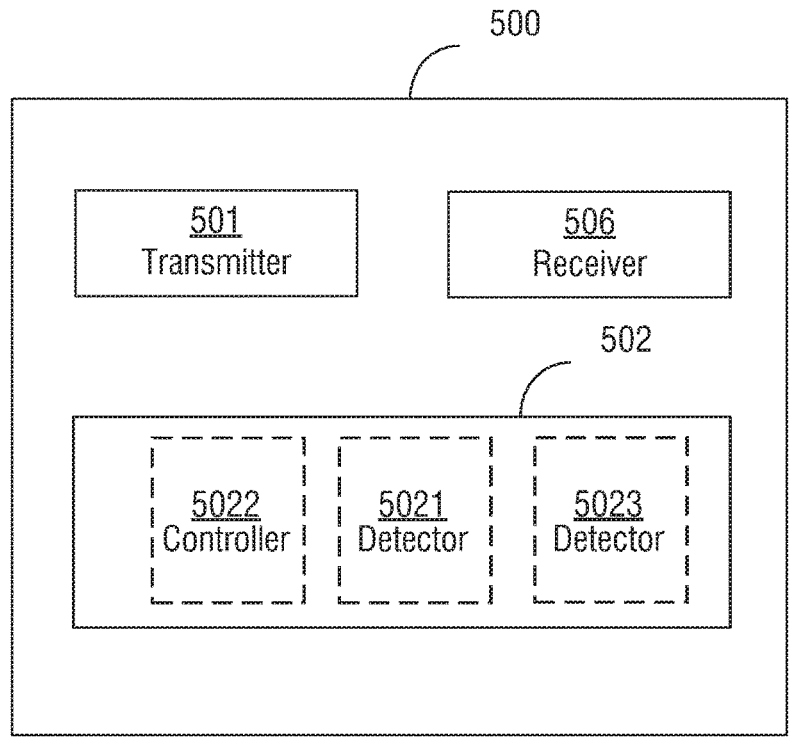
FIG. 5 schematically shows a block diagram of a communication apparatus according to an embodiment of the present invention.

FIG. 5 schematically shows a block diagram of a communication apparatus 500 according to an embodiment of the present invention.

To be noted that the structure of the communication apparatus 500 is similar to the structure of the communication apparatus 410 as shown in FIG. 4.

A communication apparatus 500, comprises: a transmitter 501 configured to transmit a first data to a terminal 420, and retransmit a second data to the terminal 420 under a retransmission condition after transmitting the first data; and a circuitry 502 configured to control a retransmission scheme for the retransmission of the second data based on at least one of a systematic bit degree and a preempted resource degree for the transmission of the first data.

Thus, the flexibility for the retransmission scheme and the decoding performance of the retransmitted data can be improved.

In an embodiment, the communication apparatus 500 may further include a receiver 506, and in an embodiment, the retransmission condition includes at least one of a first retransmission condition that the receiver 506 receives a negative response from the terminal 420 and a second retransmission condition that the receiver 506 receives no response from the terminal 420, and in an embodiment, in a case that the receiver 506receives no response from the terminal 420, the circuitry 502 is configured to determine the first data to be retransmitted if the first data was preempted for the transmission.

In an embodiment, the circuitry 502 may include a preemption circuitry 5023 configured to preempt first service resources for transmitting first service traffic to terminals by second service traffic according to a preemption scheme to make the transmitter transmit the preempted first data, and in an embodiment, the preemption scheme may include at least one of: minimizing the number of terminals whose first service resources for transmitting the first service traffic are to be preempted by the second service traffic; limiting a preempted resource size or ratio within a first service resource by a size or ratio threshold; minimizing the number of code blocks which are to be preempted; averaging preempted resource sizes or ratios among the first service resources for transmitting first service traffic; and specifying the first service resources for transmitting the first service traffic to terminals which are to receive both the first service traffic and the second service traffic, to be preempted by the second service traffic.

Thus, the preemption scheme can be flexible and further optimize the performance or signaling overhead.

In an embodiment, and in an embodiment, the transmitter 501 may be configured to transmit control signalings indicating the preemption according to a control signaling scheme, and in an embodiment, the control signaling scheme includes at least one of: transmitting group common control signalings to all the terminals in a group including first terminals which are to receive the first service traffic and second terminals which are to receive the second service traffic, the group common control signalings respectively indicating resource assignments with respective terminal IDs for the second terminals, and in an embodiment, the first terminals are able to interpret the resource assignments in the group common control signalings to obtain preemption resource situation for themselves; transmitting control signalings respectively indicating resource assignments to the respective second terminals, and transmitting other control signalings respectively indicating preemption resource situation to the respective first terminals.

Thus, the DCI designs would be flexible.

In an embodiment, the systematic bit degree may include a size of systematic bits within the first data, or a ratio of the systematic bits within the first data, and the preempted resource degree includes a size of preempted resources within the first data, or a ratio of the preempted resources within the first data.

In an embodiment, the circuitry 502 includes a detector 5021 configured to detect a first condition based on at least one of a systematic bit degree and a preempted resource degree for the transmission of the first data, and a controller 5022 configured to determine the retransmission scheme as a first retransmission scheme for retransmitting the second data with systematic bits more than a threshold, under a first condition, and in an embodiment, the first condition includes: the systematic bit degree is more than a systematic bit threshold; the preempted resource degree is more than a preempted resource threshold; or the systematic bit degree is more than a systematic bit threshold and the preempted resource degree is more than a preempted resource threshold.

In an embodiment, the preempted resource threshold could be zero, so that comparing the preempted resource degree with the preempted resource threshold of zero could indicate whether there is any resource preempted. Furthermore, if the preempted resource degree is zero, this indicates that there is no resource preempted.

In an embodiment, the first retransmission scheme includes a redundancy version with the most systematic bits, and in an embodiment, different redundancy versions indicate different starting points of a buffer including all the systematic bits and all the redundancy bits.

In an embodiment, the circuitry 502 is configured to control the retransmission scheme as a second retransmission scheme for retransmitting the second data, in a second condition other than the first condition, and in an embodiment, the second retransmission scheme is for retransmitting the second data with systematic bits no more than a threshold, or is defined by a transmission scheme order, or determined by a rule common to the communication apparatus 500 and the terminal 420.

In an embodiment, the rule common to the communication apparatus 500 and the terminal 420 may include a function of at least one of a subframe index, a slot index and a transmission time interval (TTI) index of the first data or the second data to be transmitted. Other rules are also available as long as the second retransmission scheme can be determined.

In an embodiment, the first retransmission scheme may include a redundancy version with the most systematic bits, and in an embodiment, different redundancy versions indicate different starting points of a buffer including all the systematic bits and all the redundancy bits.

Thus, the flexibility for the retransmission scheme and the decoding performance of the retransmitted data can be improved.

FIGS. 6A-6D schematically show examples of different retransmission schemes according to embodiments of the present invention.

As mentioned above, the retransmission scheme can be controlled based on at least one of the systematic bit situation (degree) and preempted resource situation (degree) of the transmitted first data. Now examples of different retransmission schemes will be described below for easy understanding and illustration, but not for limitation.

Figure 6A:
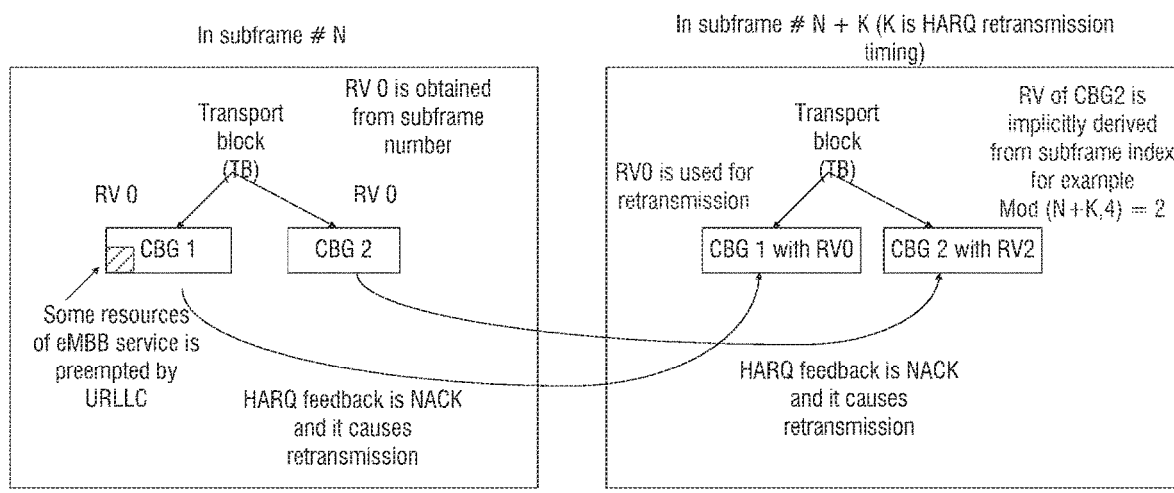
FIGS. 6A-6D schematically show examples of different retransmission schemes according to embodiments of the present invention.

As show in FIG. 6A, In a subframe #n (n is an integer), a transmitter (e.g., in a base station) transmits a transport block (TB) for eMBB traffic to a UE in a first (or initial) transmission, and such TB consists of two CBGs. It is assumed that for the first (initial) transmission, conventionally, the RV is obtained in an implicit way (for example, based on the subframe number of the transmitted TB). Thus, there is no need to indicate the RV explicitly in a DCI signaling since the UE can derive such RV also from the subframe number of the received TB. A redundancy version index of such TB (including two CBGs) is RV0 both for the two CBGs based on the subframe number (e.g., based on a function of mod(#N, 4)=0).

Some resources of such TB may be preempted for URLLC transmission (here, CBG1 is assumed to be subject to such preemption). But the UE does not decode the two CBGs successfully and a HARQ feedback of "NACK" on these two CBGs are fed back, so the base station may need to retransmit the two CBGs. It is assumed that the preempted resource size within the CBG1 is large or the occupied resource ratio within the CBG1 is large, i.e., more than a threshold, and according to the embodiment of the invention, the RV for the retransmission of CBG I would be RV0 with more systematic bits. But for CBG2, since the preemption did not occur in the CBG2, and the preempted resource size or ratio was 0, i.e., less than a threshold, the RV for the retransmission would be determined in the conventional way, i.e., RV2, based on the function of Mod (subframe #N+K, 4)=2. Basically different CBGs use different retransmission schemes in terms of redundancy version based on the preempted resource size or ratio.

The benefit of such solution is that CBG's retransmission scheme and decoding performance would be optimized while the RV indication overhead, for example in a DCI is minimized.

Figure 6B:
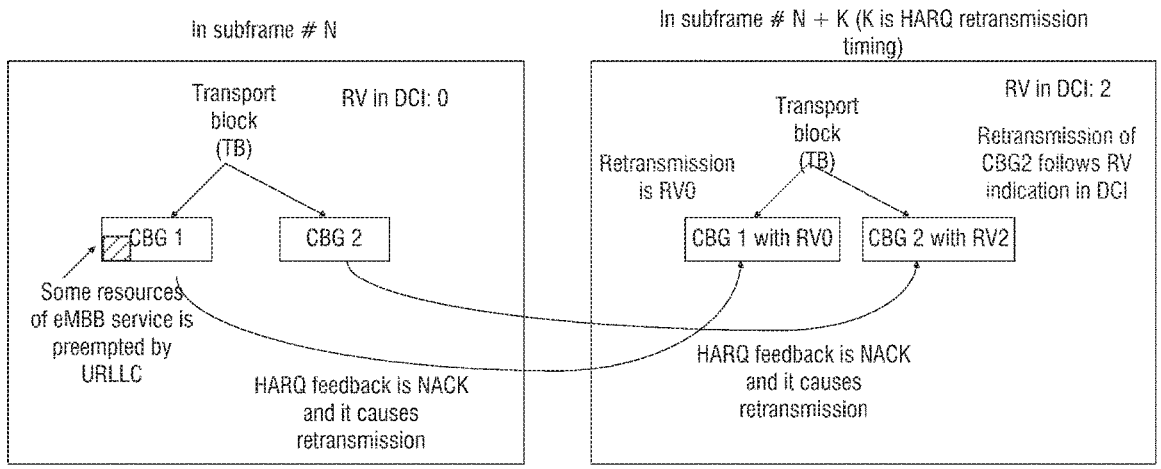

FIG. 6B is another embodiment assuming that RV is obtained in an explicit way for the first (initial) transmission. The operation is similar as the embodiment shown in FIG. 6A. In the subframe #N, a transmitter (e.g., base station) transmits a transport block (TB) for eMBB traffic for a UE and such TB consists of two CBGs. The redundancy version index of such TB (two code block groups) is RV0 both for the two CBGs based on the RV indication in a DCI signaling.

Some resources of such TB may be preempted for URLLC transmission (here CBG1 is assumed to be subject to such preemption). But the UE does not decode the two CBGs successfully and a HARQ feedback of "NACK" on these two CBGs is fed back, so the base station may need to retransmit the two CBGs. Assuming that the preempted resource size is large or the occupied resource ratio is large, the RV for the retransmission of CBG1 would be RV0 according to the embodiment of the invention. But for CBG2, since it was not preempted, and the preemption resource size or ratio is small, the RV for the retransmission is RV2 which is indicated in the DCI. Basically different CBGs use different retransmission schemes in terms of redundancy version based on the preempted resource size or ratio, regardless of the conventional way for determining RV in an implicit way or in an explicit way.

The benefit of such solution is to realize some flexibility on IR operation of non-preempted CBGs with cost of RV field of few bits. The decoding performance of each CBG is also optimized.

Figure 6C:
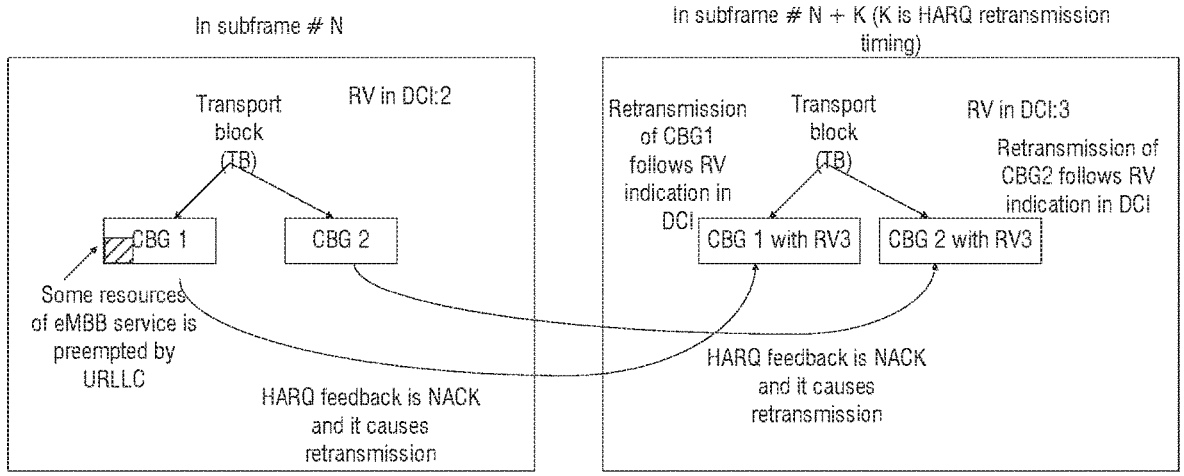

FIG. 6C is another embodiment assuming that for the first (initial) transmission, the RV is obtained in an explicit way (by a DCI signaling indicating RV2), while the preemption is on CBG1. In subframe #N, a transmitter (e.g., in a base station) transmits a transport block (TB) for eMBB traffic to a UE and such TB consists of two CBGs. The redundancy version index of such TB (two CBGs) is RV2 for both CBGs based on a RV indication in the DCI.

Some resources of such TB are preempted for URLLC transmission (here CBG1 is assumed to be subject to such preemption). But the UE does not decode the two CBGs successfully and a HARQ feedback of "NACK" on these two CBGs are fed back to the base station, so the base station may need to retransmit the two CBGs. Assuming that the systematic bit size or ratio of the preempted CBG is determined to be small by judging the redundancy version as RV2 which has less systematic bits than RV0 (or less than a threshold), both of the two CBGs would be retransmitted based on the RV indication in DCI (RV3 in this example) although some resources are preempted by URLLC.

The benefit of such solution is to realize some flexibility on IR operation of non-preempted CBGs with cost of RV field of few bits. The decoding performance of each CBG is optimized.

Figure 6D:
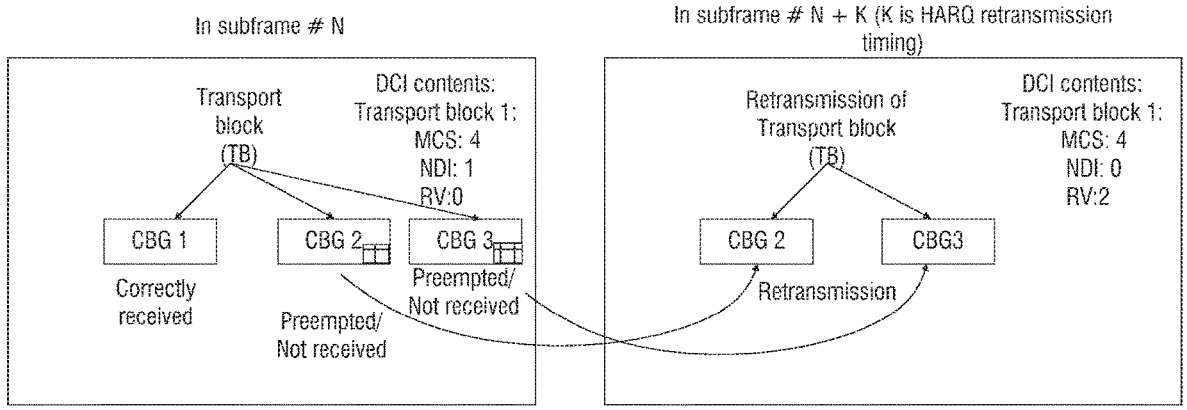

Another embodiment on the proposed scheme is shown in FIG. 6D: for the first (initial) transmission, the RV is obtained in an explicit way (by a DCI signaling indicating RV0). In the subframe #N, a transmitter (e.g., in a base station) transmits a transport block (TB) for eMBB traffic to a UE and such TB consists of three CBGs. The redundancy version index of such TB (three CBGs) is RV0 for the three CBGs based on a RV indication in the DCI.

It is assumed that the UE would not report a HARQ response in a case that pre-emption is detected on its eMBB resources, and would report a HARQ response in a case that pre-emption is not detected on its eMBB resources. For example in FIG. 6D, if the CBG2 and the CBG3 are preempted for the first (initial) transmission in the subframe #N, the UE would not report a HARQ feedback on the three CBG1, CBG2, and CBG3 in the subframe #N. And such UE does not receive correctly CBG2 and CBG3, and expects to receive retransmitted CBG2 and CBG3 (without preemption) in the next subframe (subframe #N+K) and feedback a HARQ response (because no preemption is detected on its eBMM resources, the UE may feed back the HARQ response). In the subframe #N·K, in order to determine which CBG would be retransmitted, the base station would determined the retransmitted CBG indexes (CBG2 and CBG3) implicitly from the preemption situation for the first (initial) transmission.

To be noted that FIG. 6D also shows an example in which only CBGs (CBG2 and CBG3 in this example) which need to be retransmitted would be retransmitted, but the CBG1 in the transmitted TB would not be retransmitted, because CBG1 is successfully received at the UE, and there is no need to retransmit CBG1. Thus, the retransmission data amount and wireless resource overhead would be saved.

Thus, the flexibility for the retransmission scheme and the decoding performance of the retransmitted data can be improved.

The above examples of different retransmission schemes are described above for illustration, but not for limitation.

Figure 7:
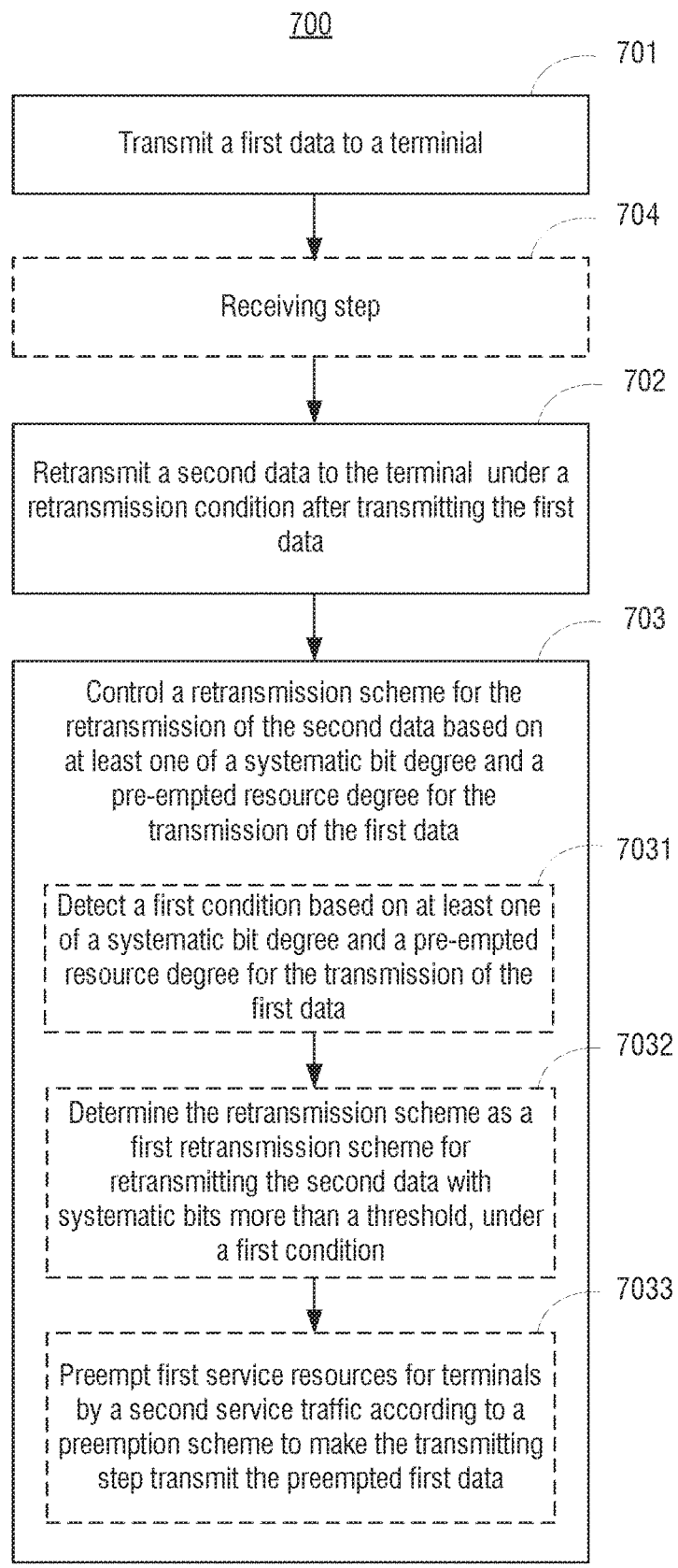
FIG. 7 schematically shows a flowchart of a wireless communication method according to an embodiment of the present invention.

FIG. 7 schematically shows a flowchart of a wireless communication method 700 according to embodiments of the present invention.

A wireless communication method 700 at a communication apparatus, comprises steps of: step 701, transmitting a first data to a terminal; step 702, retransmitting a second data to the terminal under a retransmission condition after transmitting the first data; and step 703, controlling a retransmission scheme for the retransmission of the second data based on at least one of a systematic bit degree and a preempted resource degree for the transmission of the first data.

Thus, the flexibility for the retransmission scheme and the decoding performance of the retransmitted data can be improved.

In an embodiment, the wireless communication method 700 may further include a receiving step 704, the retransmission condition includes at least one of a first retransmission condition that the receiving step 704 receives a negative response from the terminal and a second retransmission condition that the receiving step 704 receives no response from the terminal, and in an embodiment, in a case that the receiving step 704 receives no response from the terminal, the controlling step 703 determines the first data to be retransmitted if the first data was preempted for the transmission.

In an embodiment, the controlling step 703 may include a preemption step 7033 of preempting first service resources for transmitting first service traffic to terminals by second service traffic according to a preemption scheme to make the transmitting step transmit the preempted first data, and in an embodiment, the preemption scheme may include at least one of: minimizing the number of terminals whose first service resources for transmitting the first service traffic are to be preempted by the second service traffic; limiting a preempted resource size or ratio within a first service resource by a size or ratio threshold; minimizing the number of code blocks which are to be preempted; averaging preempted resource sizes or ratios among the first service resources for transmitting first service traffic; and specifying the first service resources for transmitting the first service traffic to terminals which are to receive both the first service traffic and the second service traffic, to be preempted by the second service traffic.

Thus, the preemption scheme can be flexible and further optimize the performance or signaling overhead.

In an embodiment, the transmitting step 701 transmits control signalings indicating the preemption according to a control signaling scheme, and in an embodiment, the control signaling scheme includes at least one of: transmitting group common control signalings to all the terminals in a group including first terminals which are to receive the first service traffic and second terminals which are to receive the second service traffic, the group common control signalings respectively indicating resource assignments with respective terminal IDs for the second terminals, and in an embodiment, the first terminals are able to interpret the resource assignments in the group common control signalings to obtain preemption resource situation for themselves; transmitting control signalings respectively indicating resource assignments to the respective second terminals, and transmitting other control signlings respectively indicating preemption resource situation to the respective first terminals.

Thus, the DCI designs would be flexible.

In an embodiment, the systematic bit degree may include a size of systematic bits within the first data, or a ratio of the systematic bits within the first data, and the preempted resource degree may include a size of preempted resources within the first data, or a ratio of the preempted resources within the first data.

In an embodiment, the controlling step 703 may include: step 7031, detecting a first condition based on at least one of a systematic bit degree and a preempted resource degree for the transmission of the first data, and step 7032, determining the retransmission scheme as a first retransmission scheme for retransmitting the second data with systematic bits more than a threshold, under a first condition, and in an embodiment, the first condition may include: the systematic bit degree is more than a systematic bit threshold; the preempted resource degree is more than a preempted resource threshold; or the systematic bit degree is more than a systematic bit threshold and the preempted resource degree is more than a preempted resource threshold.

In an embodiment, the preempted resource threshold could be zero, so that comparing the preempted resource degree with the preempted resource threshold of zero could indicate whether there is any resource preempted. Furthermore, if the preempted resource degree is zero, this indicates that there is no resource preempted.

In an embodiment, the first retransmission scheme may include a redundancy version with the most systematic bits, and in an embodiment, different redundancy versions may indicate different starting points of a buffer including all the systematic bits and all the redundancy bits.

in embodiment, the controlling step 703 may control the retransmission scheme as a second retransmission scheme for retransmitting the second data, in a second condition other than the first condition, and in an embodiment, the second retransmission scheme is for retransmitting the second data with systematic bits no more than a threshold, or is defined by a transmission scheme order, or determined by a rule common to the communication apparatus and the terminal.

in an embodiment, the rule common to the communication apparatus and the terminal may include a function of at least one of a subframe index, a slot index and a transmission time interval (TTI) index of the first data or the second data to be transmitted. Other rules are also available as long as the second retransmission scheme can be determined.

Thus, the flexibility for the retransmission scheme and the decoding performance of the retransmitted data can be improved.

The above description is on illustrative embodiments of the present disclosure, but not for limitation.

In addition, embodiments of the present disclosure can at least provide the following subject matters.

(1). A communication apparatus, comprising:

a transmitter configured to transmit a first data to a terminal, and retransmit a second data to the terminal under a retransmission condition after transmitting the first data; and a circuitry configured to control a retransmission scheme for the retransmission of the second data based on at least one of a systematic bit degree and a preempted resource degree for the transmission of the first data.

(2). The apparatus according to (1), wherein, the communication apparatus further includes a receiver, wherein the retransmission condition includes at least one of a first retransmission condition that the receiver receives a negative response from the terminal and a second retransmission condition that the receiver receives no response from the terminal, wherein in a case that the receiver receives no response from the terminal, the circuitry is configured to determine the first data to be retransmitted if the first data was preempted for the transmission.

(3). The apparatus according to (1), wherein, the circuitry includes a preemption circuitry configured to preempt first service resources for transmitting first service traffic to terminals by second service traffic according to a preemption scheme to make the transmitter transmit the preempted first data, wherein the preemption scheme includes at least one of:

minimizing the number of terminals whose first service resources for transmitting the first service traffic are to be preempted by the second service traffic;

limiting a preempted resource size or ratio within a first service resource by a size or ratio threshold;

minimizing the number of code blocks which are to be preempted;

averaging preempted resource sizes or ratios among the first service resources for transmitting first service traffic; and specifying the first service resources for transmitting the first service traffic to terminals which are to receive both the first service traffic and the second service traffic, to be preempted by the second service traffic.

(4). The apparatus according to (3), wherein, the transmitter is configured to transmit control signalings indicating the preemption according to a control signaling scheme, wherein the control signaling scheme includes at least one of:

transmitting group common control signalings to all the terminals in a group including first terminals which are to receive the first service traffic and second terminals which are to receive the second service traffic, the group common control signalings respectively indicating resource assignments with respective terminal IDs for the second terminals, wherein, the first terminals are able to interpret the resource assignments in the group common control signalings to obtain preemption resource situation for themselves;

transmitting control signalings respectively indicating resource assignments to the respective second terminals, and transmitting other control signlings respectively indicating preemption resource situation to the respective first terminals.

(5). The apparatus according to (1), wherein, the systematic bit degree includes a size of systematic bits within the first data, or a ratio of the systematic bits within the first data, and the preempted resource degree includes a size of preempted resources within the first data, or a ratio of the preempted resources within the first data.

(6). The apparatus according to (1), wherein, the circuitry includes a detector configured to detect a first condition based on at least one of a systematic bit degree and a preempted resource degree for the transmission of the first data, and a controller configured to determine the retransmission scheme as a first retransmission scheme for retransmitting the second data with systematic bits more than a threshold, under a first condition, wherein the first condition includes:

the systematic bit degree is more than a systematic bit threshold;

the preempted resource degree is more than a preempted resource threshold; or the systematic bit degree is more than a systematic bit threshold and the preempted resource degree is more than a preempted resource threshold.

(7). The apparatus according to (6), wherein, the first retransmission scheme includes a redundancy version with the most systematic bits, wherein different redundancy versions indicate different starting points of a buffer including all the systematic bits and all the redundancy bits.

(8). The apparatus according to (6), wherein, the circuitry is configured to control the retransmission scheme as a second retransmission scheme for retransmitting the second data, in a second condition other than the first condition, wherein the second retransmission scheme is for retransmitting the second data with systematic bits no more than a threshold, or is defined by a transmission scheme order, or determined by a rule common to the communication apparatus and the terminal.

(9). The apparatus according to (8), wherein, the rule common to the communication apparatus and the terminal includes a function of at least one of a subframe index, a slot index and a transmission time interval (TTI) index of the first data or the second data to be transmitted.

(10). The apparatus according to claim (1), wherein, the second data for the retransmission are minimal data needed to be retransmitted under the retransmission condition.

(11). A wireless communication method at a communication apparatus, comprising:

transmitting a first data to a terminal;

retransmitting a second data to the terminal under a retransmission condition after transmitting the first data; and controlling a retransmission scheme for the retransmission of the second data based on at least one of a systematic bit degree and a preempted resource degree for the transmission of the first data.

(12). The method according to (11), wherein, the wireless communication method further includes a receiving step, the retransmission condition includes at least one of a first retransmission condition that the receiving step receives a negative response from the terminal and a second retransmission condition that the receiving step receives no response from the terminal, wherein in a case that the receiving step receives no response from the terminal, the controlling step determines the first data to be retransmitted if the first data was preempted for the transmission.

(13). The method according to (11), wherein, the controlling step includes a preemption step of preempting first service resources for transmitting first service traffic to terminals by second service traffic according to a preemption scheme to make the transmitting step transmit the preempted first data, wherein the preemption scheme includes at least one of:

minimizing the number of terminals whose first service resources for transmitting the first service traffic are to be preempted by the second service traffic;

limiting a preempted resource size or ratio within a first service resource by a size or ratio threshold;

minimizing the number of code blocks which are to be preempted;

averaging preempted resource sizes or ratios among the first service resources for transmitting first service traffic; and specifying the first service resources for transmitting the first service traffic to terminals which are to receive both the first service traffic and the second service traffic, to be preempted by the second service traffic.

(14). The method according to (13), wherein, the transmitting step transmits control signalings indicating the preemption according to a control signaling scheme, wherein the control signaling scheme includes at least one of:

transmitting group common control signalings to all the terminals in a group including first terminals which are to receive the first service traffic and second terminals which are to receive the second service traffic, the group common control signalings respectively indicating resource assignments with respective terminal IDs for the second terminals, wherein, the first terminals are able to interpret the resource assignments in the group common control signalings to obtain preemption resource situation for themselves;

transmitting control signalings respectively indicating resource assignments to the respective second terminals, and transmitting other control signlings respectively indicating preemption resource situation to the respective first terminals.

(15). The method according to (11), wherein, the systematic bit degree includes a size of systematic bits within the first data, or a ratio of the systematic bits within the first data, and the preempted resource degree includes a size of preempted resources within the first data, or a ratio of the preempted resources within the first data.

(16). The method according to (11), wherein, the controlling step includes detecting a first condition based on at least one of a systematic bit degree and a preempted resource degree for the transmission of the first data, and determining the retransmission scheme as a first retransmission scheme for retransmitting the second data with systematic bits more than a threshold, under a first condition, wherein the first condition includes:

the systematic bit degree is more than a systematic bit threshold;

the preempted resource degree is more than a preempted resource threshold; or the systematic bit degree is more than a systematic bit threshold and the preempted resource degree is more than a preempted resource threshold.

(17). The method according to (16), wherein, the first retransmission scheme includes a redundancy version with the most systematic bits, wherein different redundancy versions indicate different starting points of a buffer including all the systematic bits and all the redundancy bits.

(18). The method according to (16), wherein, the controlling step controls the retransmission scheme as a second retransmission scheme for retransmitting the second data, in a second condition other than the first condition, wherein the second retransmission scheme is for retransmitting the second data with systematic bits no more than a threshold, or is defined by a transmission scheme order, or determined by a rule common to the communication apparatus and the terminal.

(19). The method according to (18), wherein, the rule common to the communication apparatus and the terminal includes a function of at least one of a subframe index, a slot index and a transmission time interval (TTI) index of the first data or the second data to be transmitted.

(20). The method according to claim (11), wherein, the second data for the retransmission are minimal data needed to be retransmitted under the retransmission condition.

(21). A communication system, comprising a communication apparatus and a terminal:

the communication apparatus comprising:

a first transmitter configured to transmit a first data to a terminal, and retransmit a second data to the terminal under a retransmission condition after transmitting the first data; and a first circuitry configured to control a retransmission scheme for the retransmission of the second data based on at least one of a systematic bit degree and a preempted resource degree for the transmission of the first data; and the terminal comprising:

a second receiver configured to receive the first data transmitted from the communication apparatus and receive the second data retransmitted from the communication apparatus according to the retransmission scheme;

a second transmitter configured to indicate the retransmission condition to the communication apparatus after receiving the first data and before receiving the second data; and a second circuitry configured to recover the retransmission scheme for the retransmission of the received second data.

(22). The system according to (21), wherein, the second transmitter is configured to transmit a negative response to the communication apparatus if the second receiver did not correctly receive the first data, or transmit no response to the communication apparatus in a case that the second circuitry discovers that the first data was preempted, to indicate the retransmission condition to the communication apparatus, the communication apparatus further includes a first receiver configured to receive the negative response from the terminal, or receive no response from the terminal, wherein in a case that the first receiver receives no response from the terminal, the first circuitry is configured to determine the first data to be retransmitted if the first data was preempted for the transmission.

(23). The system according to (21), wherein, the first circuitry includes a first preemption circuitry configured to preempt first service resources for transmitting first service traffic to terminals by second service traffic according to a preemption scheme to make the first transmitter transmit the preempted first data, wherein the preemption scheme includes at least one of:

minimizing the number of terminals whose first service resources for transmitting the first service traffic are to be preempted by the second service traffic;

limiting a preempted resource size or ratio within a first service resource by a size or ratio threshold;

minimizing the number of code blocks which are to be preempted;

averaging preempted resource sizes or ratios among the first service resources for transmitting first service traffic; and specifying the first service resources for transmitting the first service traffic to terminals which are to receive both the first service traffic and the second service traffic, to be preempted by the second service traffic.

(24). The system according to (23), wherein, the first transmitter is configured to transmit control signalings indicating the preemption according to a control signaling scheme, wherein the control signaling scheme includes at least one of:

transmitting group common control signalings to all the terminals in a group including first terminals which are to receive the first service traffic and second terminals which are to receive the second service traffic, the group common control signalings respectively indicating resource assignments with respective terminal IDs for the second terminals, wherein, the first terminals are able to interpret the resource assignments in the group common control signalings to obtain preemption resource situation for themselves;

transmitting control signalings respectively indicating resource assignments to the respective second terminals, and transmitting other control signlings respectively indicating preemption resource situation to the respective first terminals.

(25). The system according to (21), wherein, the systematic bit degree includes a size of systematic bits within the first data, or a ratio of the systematic bits within the first data, and the preempted resource degree includes a size of preempted resources within the first data, or a ratio of the preempted resources within the first data.

(26). The system according to (21), wherein, the first circuitry includes a first detector configured to detect a first condition based on at least one of a systematic bit degree and a preempted resource degree for the transmission of the first data, and a first controller configured to determine the retransmission scheme as a first retransmission scheme for retransmitting the second data with systematic bits more than a threshold, under a first condition, wherein the first condition includes:

the systematic bit degree is more than a systematic bit threshold;

the preempted resource degree is more than a preempted resource threshold; or the systematic bit degree is more than a systematic bit threshold and the preempted resource degree is more than a preempted resource threshold.

(27). The system according to (26), wherein, the first retransmission scheme includes a redundancy version with the most systematic bits, wherein different redundancy versions indicate different starting points of a buffer including all the systematic bits and all the redundancy bits.

(28). The system according to (26), wherein, the first controller is configured to control the retransmission scheme as a second retransmission scheme for retransmitting the second data, in a second condition other than the first condition, wherein the second retransmission scheme is for retransmitting the second data with systematic bits no more than a threshold, or is defined by a transmission scheme order, or determined by a rule common to the communication apparatus and the terminal.

(29). The system according to (21), wherein, the second circuitry includes a second detector configured to determine the systematic bit degree from a redundancy version for the transmission of the received first data and the preempted resource degree for the transmission of the received first data, and a second controller configured to determine the retransmission scheme for the retransmission of the received second data based on at least one of the systematic bit degree and the preempted resource degree for the transmission of the first data;

wherein different redundancy versions indicate different starting points of a buffer including all the systematic bits and all the redundancy bits.

(30). The system according to (29), wherein, the second detector is configured to determine the redundancy version for the transmission of the received first data by a received control signaling, or defined by a transmission scheme order, or determined by a rule common to the communication apparatus and the terminal, wherein the second detector is configured to determine the preempted resource degree for the transmission of the first data by a received signal indicating the preempted resource degree.

(31). The system according to (30), wherein, the rule common to the communication apparatus and the terminal includes a function of at least one of a subframe index, a slot index and a transmission time interval (TTI) index of the first data or the second data to be transmitted.

(32). The system according to claim (21), wherein, the second data for the retransmission are minimal data needed to be retransmitted under the retransmission condition.

(33). A terminal, comprising:

a second receiver configured to receive first data transmitted from a communication apparatus and receive second data retransmitted from the communication apparatus according to a retransmission scheme;

a second transmitter configured to indicate a retransmission condition to the communication apparatus after receiving the first data and before receiving the second data; and a second circuitry configured to recover the retransmission scheme for the retransmission of the received second data.

(34). The apparatus according to (33), wherein, the second transmitter is configured to transmit a negative response to the communication apparatus if the second receiver did not correctly receive the first data, or transmit no response to the communication apparatus in a case that the second circuitry discovers that the first data was preempted, to indicate the retransmission condition to the communication apparatus.

(35) A wireless communication method between a communication and a terminal, comprising:

a first wireless communication method, at the communication apparatus, comprising:

a first transmitting step of transmitting a first data to a terminal, and retransmit a second data to the terminal under a retransmission condition after transmitting the first data; and a first controlling step of controlling a retransmission scheme for the retransmission of the second data based on at least one of a systematic bit degree and a preempted resource degree for the transmission of the first data; and a second wireless communication method, at the terminal, comprising:

a second receiving step of receiving the first data transmitted from the communication apparatus and receive the second data retransmitted from the communication apparatus according to the retransmission scheme;

a second transmitting step of indicating the retransmission condition to the communication apparatus after receiving the first data and before receiving the second data; and a second controlling step of recovering the retransmission scheme for the retransmission of the received second data.

(36). The method according to (35), wherein, the second transmitting step transmits a negative response to the communication apparatus if the second receiving step did not correctly receive the first data, or transmit no response to the communication apparatus in a case that the second controlling step discovers that the first data was preempted, to indicate the retransmission condition to the communication apparatus, the first wireless communication method further includes a first receiving step of receiving the negative response from the terminal, or receiving no response from the terminal, wherein in a case that the first receiving step receives no response from the terminal, the first controlling step determines the first data to be retransmitted if the first data was preempted for the transmission.

(37). The method according to (35), wherein, the first circuitry includes a first preemption circuitry configured to preempt first service resources for transmitting first service traffic to terminals by second service traffic according to a preemption scheme to make the first transmitter transmit the preempted first data, wherein the preemption scheme includes at least one of:

minimizing the number of terminals whose first service resources for transmitting the first service traffic are to be preempted by the second service traffic;

limiting a preempted resource size or ratio within a first service resource by a size or ratio threshold;

minimizing the number of code blocks which are to be preempted;

averaging preempted resource sizes or ratios among the first service resources for transmitting first service traffic; and specifying the first service resources for transmitting the first service traffic to terminals which are to receive both the first service traffic and the second service traffic, to be preempted by the second service traffic.

(38). The method according to (37), wherein, the first transmitting step transmits control signalings indicating the preemption according to a control signaling scheme, wherein the control signaling scheme includes at least one of:

transmitting group common control signalings to all the terminals in a group including first terminals which are to receive the first service traffic and second terminals which are to receive the second service traffic, the group common control signalings respectively indicating resource assignments with respective terminal IDs for the second terminals, wherein, the first terminals are able to interpret the resource assignments in the group common control signalings to obtain preemption resource situation for themselves;

transmitting control signalings respectively indicating resource assignments to the respective second terminals, and transmitting other control signlings respectively indicating preemption resource situation to the respective first terminals.

(39). The method according to (38), wherein, the systematic bit degree includes a size of systematic bits within the first data, or a ratio of the systematic bits within the first data, and the preempted resource degree includes a size of preempted resources within the first data, or a ratio of the preempted resources within the first data.

(40). The method according to (38), wherein, the first controlling step includes a first detecting step of detecting a first condition based on at least one of a systematic bit degree and a preempted resource degree for the transmission of the first data, and a first determining step of determining the retransmission scheme as a first retransmission scheme for retransmitting the second data with systematic bits more than a threshold, under a first condition, wherein the first condition includes:

the systematic bit degree is more than a systematic bit threshold;

the preempted resource degree is more than a preempted resource threshold; or the systematic bit degree is more than a systematic bit threshold and the preempted resource degree is more than a preempted resource threshold.

(41). The method according to (40), wherein, the first retransmission scheme includes a redundancy version with the most systematic bits, wherein different redundancy versions indicate different starting points of a buffer including all the systematic bits and all the redundancy bits.

(42). The method according to (40), wherein, the first determining step controls the retransmission scheme as a second retransmission scheme for retransmitting the second data, in a second condition other than the first condition, wherein the second retransmission scheme is for retransmitting the second data with systematic bits no more than a threshold, or is defined by a transmission scheme order, or determined by a rule common to the communication apparatus and the terminal.

(43). The method according to (38), wherein, the second controlling step includes a second detecting step of determining the systematic bit degree from a redundancy version for the transmission of the received first data and the preempted resource degree for the transmission of the received first data, and a second determining step of determining the retransmission scheme for the retransmission of the received second data based on at least one of the systematic bit degree and the preempted resource degree for the transmission of the first data;

wherein different redundancy versions indicate different starting points of a buffer including all the systematic bits and all the redundancy bits.

(44). The method according to (43), wherein, the second detecting step determines the redundancy version for the transmission of the received first data by a received control signaling, or defined by a transmission scheme order, or determined by a rule common to the communication apparatus and the terminal, wherein the second detecting step determines the preempted resource degree for the transmission of the first data by a received signal indicating the preempted resource degree.

(45). The method according to (44), wherein, the rule common to the communication apparatus and the terminal includes a function of at least one of a subframe index, a slot index and a transmission time interval (TTI) index of the first data or the second data to be transmitted.

(46). The method according to claim (33), wherein, the second data for the retransmission are minimal data needed to be retransmitted under the retransmission condition.

(47). A wireless communication method, at a terminal, comprising:

a receiving step of receiving first data transmitted from a communication apparatus and receive second data retransmitted from the communication apparatus according to a retransmission scheme;

a transmitting step of indicating a retransmission condition to the communication apparatus after receiving the first data and before receiving the second data; and a second controlling step of recovering the retransmission scheme for the retransmission of the received second data.

(48). The method according to (47), wherein, the transmitting step transmits a negative response to the communication apparatus if the second receiver did not correctly receive the first data, or transmits no response to the communication apparatus in a case that the second circuitry discovers that the first data was preempted, to indicate the retransmission condition to the communication apparatus.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Examples of several embodiments of the present disclosure have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present disclosure. For example, it will be readily appreciated that although the above embodiments are described with reference to parts of a The 3rd Generation Partnership Project (3GPP) network, an embodiment of the present disclosure will also be applicable to like networks, such as a successor of the 3GPP network, having like functional components.

Therefore, in particular, the terms 3GPP and associated or related terms used in the above description and in the enclosed drawings and any appended claims now or in the future are to be interpreted accordingly.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A communication apparatus comprising:
a transmitter configured to transmit first data to a terminal, and retransmit second data to the terminal under a retransmission condition after transmitting the first data; and
a circuitry configured to control a retransmission scheme for the retransmission of the second data based on at least one of a systematic bit degree and a preempted resource degree for the transmission of the first data.

2. The apparatus according to claim 1, wherein, the communication apparatus further includes a receiver,
wherein the retransmission condition includes at least one of a first retransmission condition that the receiver receives a negative response from the terminal and a second retransmission condition that the receiver receives no response from the terminal,
wherein in a case that the receiver receives no response from the terminal, the circuitry is configured to determine the first data to be retransmitted if the first data was preempted for the transmission.

3. The apparatus according to claim 1, wherein, the circuitry includes a preemption circuitry configured to preempt first service resources for transmitting first service traffic to terminals by second service traffic according to a preemption scheme to make the transmitter transmit the preempted first data,
wherein the preemption scheme includes at least one of:
minimizing the number of terminals whose first service resources for transmitting the first service traffic are to be preempted by the second service traffic;
limiting a preempted resource size or ratio within a first service resource by a size or ratio threshold;
minimizing the number of code blocks which are to be preempted;
averaging preempted resource sizes or ratios among the first service resources for transmitting first service traffic; and specifying the first service resources for transmitting the first service traffic to terminals which are to receive both the first service traffic and the second service traffic, to be preempted by the second service traffic.

4. The apparatus according to claim 3, wherein, the transmitter is configured to transmit control signalings indicating the preemption according to a control signaling scheme,
wherein the control signaling scheme includes at least one of:
transmitting group common control signalings to all the terminals in a group including first terminals which are to receive the first service traffic and second terminals which are to receive the second service traffic, the group common control signalings respectively indicating resource assignments with respective terminal identifiers for the second terminals, wherein, the first terminals are able to interpret the resource assignments in the group common control signalings to obtain preemption resource situation for themselves;
transmitting control signalings respectively indicating resource assignments to the respective second terminals, and transmitting other control signalings respectively indicating preemption resource situation to the respective first terminals.

5. The apparatus according to claim 1, wherein, the systematic bit degree includes a size of systematic bits within the first data, or a ratio of the systematic bits within the first data, and the preempted resource degree includes a size of preempted resources within the first data, or a ratio of the preempted resources within the first data.

6. The apparatus according to claim 1, wherein, the circuitry includes a detector configured to detect a first condition based on at least one of a systematic bit degree and a preempted resource degree for the transmission of the first data, and a controller configured to determine the retransmission scheme as a first retransmission scheme for retransmitting the second data with systematic bits more than a threshold, under a first condition,
wherein the first condition includes:
the systematic bit degree is more than a systematic bit threshold;
the preempted resource degree is more than a preempted resource threshold; or
the systematic bit degree is more than a systematic bit threshold and the preempted resource degree is more than a preempted resource threshold.

7. The apparatus according to claim 6, wherein, the first retransmission scheme includes a redundancy version with the most systematic bits,
wherein different redundancy versions indicate different starting points of a buffer including all the systematic bits and all the redundancy bits.

8. The apparatus according to claim 6, wherein, the circuitry is configured to control the retransmission scheme as a second retransmission scheme for retransmitting the second data, in a second condition other than the first condition,
wherein the second retransmission scheme is for retransmitting the second data with systematic bits no more than a threshold, or is defined by a transmission scheme order, or determined by a rule common to the communication apparatus and the terminal.

9. The apparatus according to claim 8, wherein, the rule common to the communication apparatus and the terminal includes a function of at least one of a subframe index, a slot index and a transmission time interval (TTI) index of the first data or the second data to be transmitted.

10. The apparatus according to claim 1, wherein, the second data for the retransmission are minimal data needed to be retransmitted under the retransmission condition.

11. A wireless communication method, at a communication apparatus, comprising:
transmitting first data to a terminal;
retransmitting second data to the terminal under a retransmission condition after transmitting the first data; and
controlling a retransmission scheme for the retransmission of the second data based on at least one of a systematic bit degree and a preempted resource degree for the transmission of the first data.

12. A communication system comprising a communication apparatus and a terminal:
the communication apparatus comprising:
a first transmitter configured to transmit first data to the terminal, and retransmit second data to the terminal under a retransmission condition after transmitting the first data; and
a first circuitry configured to control a retransmission scheme for the retransmission of the second data based on at least one of a systematic bit degree and a preempted resource degree for the transmission of the first data; and
the terminal comprising:
a second receiver configured to receive the first data transmitted from the communication apparatus and receive the second data retransmitted from the communication apparatus according to the retransmission scheme;
a second transmitter configured to indicate the retransmission condition to the communication apparatus after receiving the first data and before receiving the second data; and
a second circuitry configured to recover the retransmission scheme for the retransmission of the received second data.

13. The system according to claim 12, wherein, the second transmitter is configured to transmit a negative response to the communication apparatus if the second receiver did not correctly receive the first data, or transmit no response to the communication apparatus in a case that the second circuitry discovers that the first data was preempted, to indicate the retransmission condition to the communication apparatus,
the communication apparatus further includes a first receiver configured to receive the negative response from the terminal, or receive no response from the terminal,
wherein in a case that the first receiver receives no response from the terminal, the first circuitry is configured to determine the first data to be retransmitted if the first data was preempted for the transmission.

14. The system according to claim 12, wherein, the first circuitry includes a first preemption circuitry configured to preempt first service resources for transmitting first service traffic to terminals by second service traffic according to a preemption scheme to make the first transmitter transmit the preempted first data,
wherein the preemption scheme includes at least one of:
minimizing the number of terminals whose first service resources for transmitting the first service traffic are to be preempted by the second service traffic;
limiting a preempted resource size or ratio within a first service resource by a size or ratio threshold;
minimizing the number of code blocks which are to be preempted;
averaging preempted resource sizes or ratios among the first service resources for transmitting first service traffic; and
specifying the first service resources for transmitting the first service traffic to terminals which are to receive both the first service traffic and the second service traffic, to be preempted by the second service traffic.

15. The system according to claim 14, wherein, the first transmitter is configured to transmit control signalings indicating the preemption according to a control signaling scheme,
wherein the control signaling scheme includes at least one of:
transmitting group common control signalings to all the terminals in a group including first terminals which are to receive the first service traffic and second terminals which are to receive the second service traffic, the group common control signalings respectively indicating resource assignments with respective terminal identifiers for the second terminals, wherein, the first terminals are able to interpret the resource assignments in the group common control signalings to obtain preemption resource situation for themselves;
transmitting control signalings respectively indicating resource assignments to the respective second terminals, and transmitting other control signalings respectively indicating preemption resource situation to the respective first terminals.

16. The system according to claim 12, wherein, the systematic bit degree includes a size of systematic bits within the first data, or a ratio of the systematic bits within the first data, and the preempted resource degree includes a size of preempted resources within the first data, or a ratio of the preempted resources within the first data.

17. The system according to claim 12, wherein, the first circuitry includes a first detector configured to detect a first condition based on at least one of a systematic bit degree and a preempted resource degree for the transmission of the first data, and a first controller configured to determine the retransmission scheme as a first retransmission scheme for retransmitting the second data with systematic bits more than a threshold, under a first condition,
wherein the first condition includes:
the systematic bit degree is more than a systematic bit threshold;
the preempted resource degree is more than a preempted resource threshold; or
the systematic bit degree is more than a systematic bit threshold and the preempted resource degree is more than a preempted resource threshold.

18. The system according to claim 17, wherein, the first controller is configured to control the retransmission scheme as a second retransmission scheme for retransmitting the second data, in a second condition other than the first condition,
wherein the second retransmission scheme is for retransmitting the second data with systematic bits no more than a threshold, or is defined by a transmission scheme order, or determined by a rule common to the communication apparatus and the terminal.

19. The system according to claim 12, wherein, the second circuitry includes a second detector configured to determine the systematic bit degree from a redundancy version for the transmission of the received first data and the preempted resource degree for the transmission of the received first data, and a second controller configured to determine the retransmission scheme for the retransmission of the received second data based on at least one of the systematic bit degree and the preempted resource degree for the transmission of the first data;

wherein different redundancy versions indicate different starting points of a buffer including all the systematic bits and all the redundancy bits.

20. The system according to claim 19, wherein, the second detector is configured to determine the redundancy version for the transmission of the received first data by a received control signaling, or defined by a transmission scheme order, or determined by a rule common to the communication apparatus and the terminal, wherein the second detector is configured to determine the preempted resource degree for the transmission of the first data by a received signal indicating the preempted resource degree.

\* \* \* \* \*